US010987868B2

(12) United States Patent
Houben et al.

(10) Patent No.: US 10,987,868 B2
(45) Date of Patent: *Apr. 27, 2021

(54) PRODUCTION LINE FOR MAKING TANGIBLE PRODUCTS BY LAYERWISE MANUFACTURING

(71) Applicant: Nederlandse Organisatie voor toegepast-natuurwetenschappelijk onderzoek TNO, 's-Gravenhage (NL)

(72) Inventors: René Jos Houben, 's-Gravenhage (NL); Andries Rijfers, 's-Gravenhage (NL); Leonardus Antonius Maria Brouwers, 's-Gravenhage (NL); Augustinus Gerardus Maria Biemans, 's-Gravenhage (NL); Frits Kornelis Feenstra, 's-Gravenhage (NL)

(73) Assignee: NEDERLANDSE ORGANISATIE VOOR TOEGEPAST-NATUURWETENSCHAPPELIJK ONDERZOEK TNO, 's-Gravenhage (NL)

( * ) Notice: Subject to any disclaimer, the term of this patent is extended or adjusted under 35 U.S.C. 154(b) by 161 days.

This patent is subject to a terminal disclaimer.

(21) Appl. No.: 16/371,810

(22) Filed: Apr. 1, 2019

(65) Prior Publication Data

US 2019/0224919 A1    Jul. 25, 2019

Related U.S. Application Data

(63) Continuation-in-part of application No. 15/305,876, filed as application No. PCT/NL2015/050275 on Apr. (Continued)

(30) Foreign Application Priority Data

Oct. 31, 2012  (EP) ..................................... 12190707
Apr. 30, 2014  (EP) ..................................... 14166552

(51) Int. Cl.
*B29C 64/245* (2017.01)
*B29C 64/379* (2017.01)
(Continued)

(52) U.S. Cl.
CPC .......... *B29C 64/379* (2017.08); *B29C 64/106* (2017.08); *B29C 64/112* (2017.08);
(Continued)

(58) Field of Classification Search
CPC ............ B29C 67/0081; B29C 67/0085; B29C 67/0055; B29C 67/0074; B22F 7/02;
(Continued)

(56) References Cited

U.S. PATENT DOCUMENTS 3,470,996 A    10/1969  Lombardi
3,796,327 A *   3/1974  Meyer ..................... B23Q 7/10
                                            414/222.02
(Continued)

FOREIGN PATENT DOCUMENTS

DE    10256672 A1    6/2004
EP     1316408 A1    6/2003
(Continued)

*Primary Examiner* — Jacob J Cigna
(74) *Attorney, Agent, or Firm* — Hoffmann & Baron, LLP

(57) ABSTRACT

A production line for making tangible products by layerwise manufacturing. The production line includes: first and second movable carriers, each carrier comprising a transporter for transporting the carrier, and a building platform for supporting a tangible product, one or more deposition heads for depositing construction material in a deposition direction onto the building platforms, and a conveyor for conveying the first and second building platform towards the deposition head and away from the deposition head repeatedly. The first and the second transporter are movable at variable speeds
(Continued)

relative to each other along a trajectory of the conveyor. Optionally, the height of the building platforms can be adjusted.

13 Claims, 15 Drawing Sheets

Related U.S. Application Data 23, 2015, now Pat. No. 10,421,265, said application No. 16/371,810 is a continuation-in-part of application No. 14/439,690, filed as application No. PCT/NL2013/050774 on Oct. 30, 2013, now Pat. No. 10,226,894.

(51) Int. Cl.
| | |
|---|---|
| *B33Y 30/00* | (2015.01) |
| *B33Y 40/00* | (2020.01) |
| *B33Y 50/02* | (2015.01) |
| *B29C 64/106* | (2017.01) |
| *B29C 64/112* | (2017.01) |
| *B29C 64/176* | (2017.01) |
| *B33Y 99/00* | (2015.01) |

(52) U.S. Cl.
CPC .......... *B29C 64/176* (2017.08); *B29C 64/245* (2017.08); *B33Y 30/00* (2014.12); *B33Y 40/00* (2014.12); *B33Y 50/02* (2014.12); *B33Y 99/00* (2014.12)

(58) Field of Classification Search
CPC ........ B22F 3/10; B22F 3/24; B22F 2003/247; B33Y 10/00; B33Y 30/10; B29L 2031/772
See application file for complete search history.

(56) References Cited

U.S. PATENT DOCUMENTS

| | | | | |
|---|---|---|---|---|
| 4,894,908 A | * | 1/1990 | Haba, Jr. ............... | B23P 21/004 29/711 |
| 5,301,863 A | * | 4/1994 | Prinz ...................... | B22F 3/008 228/33 |
| 5,354,414 A | * | 10/1994 | Feygin ................... | B29C 41/36 216/34 |
| 5,354,542 A | * | 10/1994 | Tanaka ................... | B01J 19/004 15/56 |
| 5,477,663 A | * | 12/1995 | Smith ..................... | B65B 5/08 53/244 |
| 5,510,066 A | * | 4/1996 | Fink ...................... | B29C 64/112 264/40.1 |
| 6,607,073 B2 | | 8/2003 | Büchi et al. | |
| 6,830,643 B1 | | 12/2004 | Hayes | |
| 7,291,002 B2 | * | 11/2007 | Russell .................. | B29C 64/112 425/447 |
| 8,201,723 B2 | * | 6/2012 | Kilibarda ............... | B62D 65/02 228/49.1 |
| 9,517,592 B2 | | 12/2016 | Yoo et al. | |
| 2002/0145213 A1 | | 10/2002 | Liu et al. | |
| 2003/0205851 A1 | * | 11/2003 | Laschutza ............. | B29C 64/153 264/496 |
| 2003/0224081 A1 | | 12/2003 | Fong | |
| 2004/0003738 A1 | | 1/2004 | Imiolek et al. | |
| 2005/0228525 A1 | | 10/2005 | Brill et al. | |
| 2009/0020919 A1 | | 1/2009 | Marsac | |
| 2009/0076643 A1 | | 3/2009 | Silverbrook | |
| 2009/0291308 A1 | | 11/2009 | Pfister et al. | |
| 2009/0314201 A1 | | 12/2009 | Baccini | |
| 2010/0006640 A1 | | 1/2010 | Culp et al. | |
| 2011/0054672 A1 | * | 3/2011 | McFarland ............. | B42C 19/08 700/225 |
| 2011/0190904 A1 | * | 8/2011 | Lechmann ............. | B22F 3/1055 623/23.61 |
| 2012/0059504 A1 | | 3/2012 | Pax et al. | |
| 2012/0211155 A1 | | 8/2012 | Wehning et al. | |
| 2013/0075022 A1 | * | 3/2013 | Chillscyzn ............ | G03G 15/24 156/230 |
| 2013/0108726 A1 | | 5/2013 | Uckelmann et al. | |
| 2013/0189435 A1 | | 7/2013 | Mackie et al. | |
| 2013/0248323 A1 | | 9/2013 | Sotelo et al. | |
| 2014/0065194 A1 | | 3/2014 | Yoo et al. | |
| 2014/0167326 A1 | | 6/2014 | Jones et al. | |
| 2015/0165695 A1 | | 6/2015 | Chen et al. | |
| 2015/0224718 A1 | * | 8/2015 | Ederer .................. | B29C 64/176 264/308 |
| 2015/0290878 A1 | * | 10/2015 | Houben .................... | B22F 3/24 419/1 |
| 2016/0159006 A1 | * | 6/2016 | Wang .................... | B29C 64/118 425/166 |
| 2016/0311174 A1 | * | 10/2016 | Foley ....................... | B29C 64/35 |
| 2017/0050379 A1 | * | 2/2017 | Houben ................. | B33Y 10/00 |
| 2017/0050386 A1 | * | 2/2017 | Houben ................. | B29C 64/35 |

FOREIGN PATENT DOCUMENTS

| | | | | |
|---|---|---|---|---|
| EP | 1946910 A3 | | 7/2008 | |
| EP | 2289652 A1 | | 3/2011 | |
| EP | 2727709 A1 | | 10/2012 | |
| JP | 2005088390 A | | 4/2005 | |
| JP | 2006159370 A | * | 6/2006 | |
| JP | 2012106437 A2 | | 6/2012 | |
| WO | WO2004014637 A1 | | 2/2004 | |
| WO | WO2004108398 A1 | | 12/2004 | |
| WO | WO2012076205 A1 | | 6/2012 | |
| WO | WO2013092757 A1 | | 6/2013 | |
| WO | WO-2017034951 A1 | * | 3/2017 | ............ B29C 64/188 |

* cited by examiner

PRODUCTION LINE FOR MAKING TANGIBLE PRODUCTS BY LAYERWISE MANUFACTURING

This application claims priority from and is a continuation of U.S. patent application Ser. No. 15/305,876, filed Oct. 21, 2016, which claims priority from International Patent Application Number PCT/NL2015/050275, filed Apr. 23, 2015, which claims priority from EP 14165552.2, filed Apr. 23, 2014, each of which is incorporated herein by reference. This application also claims priority from and is a continuation-in-part of U.S. patent application Ser. No. 16/274,810, filed Feb. 13, 2019, which is a continuation of U.S. patent application Ser. No. 14/439,690, filed Apr. 30, 2015, now U.S. Pat. No. 10,226,894, issued Mar. 12, 2019, which claims priority from International Patent Application Number PCT/NL2013/050774, filed Oct. 30, 2013, which claims priority from EP 12190707.5, filed Oct. 31, 2012, all of which are incorporated herein by reference.

FIELD OF THE INVENTION

The invention relates to a production line for layerwise manufacturing of tangible products. More in particular it relates to such a production line comprising a first and a second movable carrier, each carrier comprising a transporter for transporting the carrier, and a building platform for supporting a tangible product. The production line further comprises a deposition head for depositing construction material in a deposition direction onto the first and the second building platform and the production line comprises a conveyor for conveying the first and the second building platform towards the deposition head and away from the deposition head repeatedly.

The invention also relates to a method for layerwise manufacturing of tangible products according to which a first carrier comprising a first building platform for receiving construction material is moving relative to a conveyor along a trajectory leading the first building platform along the deposition head.

The invention also relates to a method for making tangible products by layerwise manufacturing. More in particular, the invention relates to such a method comprising the steps of (i) depositing in a deposition area, by using a material providing device, a layer of construction material onto a building platform for building a first layered product, (ii) conveying, by using a conveyor, the building platform away from the deposition area, (iii) removing the first layered product from the building platform, (iv) adjusting the distance between the material providing device and the building platform in a direction that is parallel to the building direction, and (v) depositing construction material onto said platform to obtain a second layered product after the first layered product has been removed.

The invention further relates to a production line for layerwise manufacturing of tangible products. More in particular, the invention relates to such a production line comprising (i) a building platform for carrying a tangible product, (ii) a deposition head for providing a layer of construction material onto the building platform, (iii) a conveyor for conveying the building platform in a conveying plane, and (iv) height adjustment means for adjusting the distance between the deposition head and the building platform.

BACKGROUND OF THE INVENTION

Layerwise manufacturing is a manufacturing method wherein tangible three-dimensional products are made by successive addition of layers on top of each other, which layers correspond to the cross sections at different levels of the tangible product. Layered products can be made by providing a uniform layer of liquid or powder, which liquid or powder is solidified in a predefined two dimensional pattern corresponding to the cross section of the product to be manufactured. The remaining, not solidified material is removed afterwards. The layers can also be directly deposited in the required two dimensional pattern, for example by printing. In such a method, the pattern is already determined during deposition of the material, not by the solidification. The material can be an ink or powder, which ink or powder is cured, sintered, or otherwise solidified, for example by evaporation of a solvent, to obtain a coherent product.

The products are often made on top of a building platform that can be displaced in a vertical direction. However, there are also layered manufacturing systems in which the product is hanging below the building platform. An example of such a system is disclosed in German patent application DE 10256672. Typically, such a system comprises a dish with liquid that can be solidified, for example by ultraviolet (UV) light. The building platform that is positioned above the bottom of the dish, moves upwards to allow the formation of a thin liquid film between platform (or previous solidified layer) and the bottom of the dish. The film is solidified in the predefined pattern, and after this solidification the platform is move further upward. These steps are repeated until the product is finished. Finally, the finished product is removed from the platform and this platform can be used for making another product.

In another known apparatus and method for layerwise manufacturing of a tangible three-dimensional product, a powder is used as a starting material, which powder is solidified by for example sintering. Such a method is disclosed in United States patent application US2009/0291308. According to this known method, a thin layer of powder is provided to an area that is delimited by a vertical wall and, at the bottom side, by a building platform. The layer is solidified by sintering into a coherent solid layer with a predefined shape, being a cross section of the product. Subsequently, the platform supporting the solidified layer moves downwards and a new powder layer is applied. The steps are repeated until the product is finished. Subsequently, the part of the powder that is not solidified and the finished product are removed before making another product.

The afore-mentioned systems have in common that they have one platform that is movable in the vertical direction. Such systems are in particular suitable for making products out of one type of material. It is possible to make several products having different shapes on such a platform, simultaneously. An example of such a method is disclosed in international patent application WO2004/014637. This known method is limited to products made out of one type of material. In principle, however, also powder-based systems are suitable for making products in which individual layers are made out of different materials. Such a system is for example disclosed in United States patent application US2002/0145213.

There are also apparatus having more than one building platform. An example of such an apparatus is disclosed in International patent application WO 2012/076205. This apparatus comprises different building platforms, which provides more flexibility than systems with only one building platform because it allows making different products quasi simultaneously.

Still another way of making tangible products by layerwise manufacturing is three-dimensional printing. In three-dimensional printing, an ink is applied either as a continuous layer or in a predefined pattern corresponding to a cross section of the product. Three-dimensional printing is in certain aspects more flexible than the methods mentioned above, in particular when the ink is applied by printing heads. Different printing heads can be used to apply different materials for manufacturing composite products comprising several materials. Further, the printing heads can be switched on and off easily for better control of the manufacturing process. An example of a production line for layerwise manufacturing using print heads is disclosed in United States patent application US2009/0076643. This known production line can be used for making several tangible products by layerwise manufacturing. The production line comprises several printing heads for depositing material onto carriers, which printing heads are positioned above a conveyor that passes the carriers from one printing head to another printing head. The printing heads are positioned in line of each other in the conveying direction. Further, the height of each printing head can be adjusted with respect to the conveyor for example to compensate for increasing height of the product during the different stages of its manufacture, viz. the number of layers already deposited. This production line allows manufacturing of several products with different geometrical shape and different material composition. Each layer of the product is created by one or even more printing heads, resulting in a huge number of printing heads for manufacturing a product of substantial size.

Also, international application WO2004/108398 discloses the use of one or more build stations for depositing material layerwise on a building platform. While the machine produces multiple products, it lacks potential for scaling up to industrial volumes. US 20140065194 relates to a three-dimensional printing system utilizing plural build modules. The build modules function to receive powder that is solidified into a build product. A diverter directs build modules or build plates comprising printed beds from a conveyor of the build system onto an adjoining conveyor.

SUMMARY OF THE INVENTION

It is an objective of the present invention to provide a production line for additive manufacturing of tangible products, which production line allows rapid manufacturing of products.

This objective of the invention is obtained by a production line for layerwise manufacturing of tangible products comprising:

a first and a second movable carrier, each carrier comprising a transporter for transporting the carrier, and a building platform for supporting a tangible product, one or more depositions head for depositing construction material in a deposition direction onto the first and the second building platform, a conveyor for conveying the first and second building platform towards the deposition head and away from the deposition head repeatedly, wherein the first and the second transporter are movable at variable speeds relative to each other along a trajectory of the conveyor.

An advantage of the two transporters being movable relative to each other along the conveyor is that the two carriers comprising the building platforms need not to move with the same speed at a certain moment in time. An effect of different speeds is that the speed of each building platform can be adapted to a specific position in the production line or to a specific process that the product on the building platform has to undergo. An advantage of this effect is that the speed of the building platforms is not determined by the slowest process at any of the building platforms of the production line. While for example the first building platform is moving relatively slow to allow deposition of a layer, the second building platform may move at a relatively fast speed back to the deposition head. The second building platform may also stand still while the first building platform is moving.

This solves a problem when the production line is only in part provided with building platforms for building products, e.g. when a number of products to be manufactured is limited. In particular, when a filling level is not complete, a building station may not be replenished in time with a subsequent building platform.

In an embodiment of the production line, the production line comprises height adjustment means that are configured for displacing a building platform of a carrier relative to a transporter of the carrier in a direction parallel to the deposition direction.

An advantage of the height adjustment means being configured for displacing a building platform relative to a transporter in a direction parallel to the deposition direction, is that the deposition head may be placed at a fixed position and that the distance between the deposition head and the building platform can be adjusted when the building platform is removed from the area in which the deposition takes place, viz. away from the deposition head. The effect is that the deposition head can be used to make another product on a different building platform during the time that the height of the building platform is being adjusted. This allows a more efficient use of the deposition head during the layerwise manufacturing of tangible products.

In another embodiment of the production line, a building platform of a carrier is movable relative to a transporter of the carrier in a plane perpendicular to the deposition direction. The platform may be rotatable, transferable, or both rotatable and transferable in the plane. An advantage of a platform that is movable relative to a transporter in such a way is that the product on the platform can be oriented relative to the transporter and the conveyor in order to obtain better positioning relative to for example the deposition head. Another advantage is that the platform can be positioned relative to another platform in a more efficient way in case that the platform has for example a rectangular, non-square shape.

In still another embodiment of the production line, the conveyor is an endless conveyor. An advantage of an endless conveyor is that, in use, the building platforms may approach a deposition head repeatedly from the same side when the building platforms move unidirectional. The effect is that the order in which the platforms approach the deposition head may remain the same and that no time is lost in reversing the motion of the platform at the end of the conveyor as will be the case for a finite conveyor. The endless conveyor may be combined with the height adjustment means for adjusting the height of a building platform. Whether or not the platform is height adjustable, it may be movable in a plane perpendicular to the deposition direction, or not.

In still another embodiment, the conveyer is arranged to allow conveying the building platforms along different trajectories. Conveying the building platforms along different trajectories allows the building platforms to pass different working stations along the different trajectories. This allows making different products on different platforms and it allows depositing different layers on each building platform. The effect is that the production line is flexible with respect to the products that can be made simultaneously.

A further objective of the present invention is to provide a method for layerwise manufacturing of tangible products, which method allows rapid manufacturing of products. This objective is obtained by a method for layerwise manufacturing of tangible products according to which a first carrier comprising a first building platform for receiving construction material is moving relative to a conveyor along a trajectory leading the first building platform along the deposition head characterized in that the first carrier is moving relative to a second carrier comprising a second building platform for receiving construction material, which second carrier is movable relative to the conveyor along a trajectory leading the second building platform along the deposition head.

An advantage of a first carrier comprising a first building platform moving relative to a second carrier comprising a second building platform on the trajectory that leads both platforms along the deposition head is that the platforms do not need to have the same speed during the whole process. An effect is that one of the platforms can move slower than the other platform in order to allow a certain processing on the platform. An effect is also that one of the platforms can move faster than the other platform, for example when no processing is performed on the platform. Due to the fact that the speed of a building platform can be adapted for a specific step in the manufacturing process of the products, the whole manufacturing process can be faster than in case al platforms are moving with the same speed.

It is another objective of the present invention to provide a method for making tangible products by layerwise manufacturing, which method allows rapid manufacturing of such products at low costs. This objective of the invention, as shown in FIG. 1 is obtained by a method for making tangible products by layerwise manufacturing comprising the steps of:

(1) depositing in a deposition area, by using a material providing device, a layer of construction material onto a first building platform for building a first layered product, (2) conveying, by using a conveyor, the first building platform away from the deposition area, (3) removing the first layered product from the first building platform, (4) adjusting the distance between the material providing device and the first building platform in a direction that is parallel to the building direction, wherein said adjusting is realized by moving the first building platform relative to the conveyor (5) depositing construction material onto said first building platform to obtain a second layered product after the first layered product has been removed, (6) using the conveyor to repeatedly move the first building platform past the material providing device to obtain the first layered product, and optionally depositing in a deposition area, by using a material providing device, a layer of construction material onto a second building platform for building a third layered product before the first layered product has been removed.

An advantage of moving the building platform relative to the conveyor in order to adjust the distance between the material providing device and the building platform is that the material providing device need not to be moved and therefore can be placed at a fixed position. Keeping the material providing device at a fixed position has the effect that there is no need for stopping the deposition process during adjustment of the distance between the device and a platform onto which material has to be deposited. As a consequence, there is more time available for depositing material and therefore the device can be used more efficiently.

An advantage of moving the building platform repeatedly past the material providing device is that subsequent layers of the same material can be deposited with the same material providing device. Passing a material providing device repeatedly has the effect that the number of such devices for making tangible products can be limited compared to a method wherein each layer is deposited by a separate deposition device. The use of only one or a limited number of deposition devices makes the method more costs efficient than a method in which a building platform passes a deposition device only once.

An advantage of depositing construction material onto a second building platform while the first layered product is still being constructed is that multiple products are made quasi simultaneously. The effect of this quasi-simultaneous production is that more products can be made in a certain time span. Consequently, a more efficient production method is obtained.

Another objective of the present invention is to provide a production line for additive manufacturing of tangible products, which production line allows rapid manufacturing of mutually different products. This objective is obtained by a production line for layerwise manufacturing of tangible products as shown in FIG. 5 and comprising:

a first building platform (202) for carrying a tangible product, a deposition head (4) for providing a layer of construction material onto the first building platform, a conveyor (205) for conveying the first building platform in a conveying plane, wherein the conveyor conveys the first building platform towards the deposition head and away from the deposition head repeatedly, height adjustment means (8) for adjusting the distance between the deposition head and the first building platform, wherein the height adjustment means (8) is configured for displacing the first building platform relative to the conveyor in a direction perpendicular to the conveying plane, and a second building platform for receiving said construction material, which second building platform is conveyable by said conveyor and which second building platform is displaceable relative to the conveyor independent from the first building platform.

An advantage of a conveyor for repeatedly conveying the platform towards the deposition head and away from the deposition head is that each platform can pass a single deposition head several times. The effect of passing a single deposition head several times is that only a limited number of deposition heads, possibly only one deposition head is required for making a tangible product. A production line comprising only a limited number of deposition heads will cost less than a production line in which each layer is deposited by a separate deposition head.

An advantage of a second building platform for receiving the material is that a second product, that may be different from the first product, can be made simultaneously with the first product. This makes the production line more efficient.

DETAILED DESCRIPTION OF THE INVENTION

Figure 1:
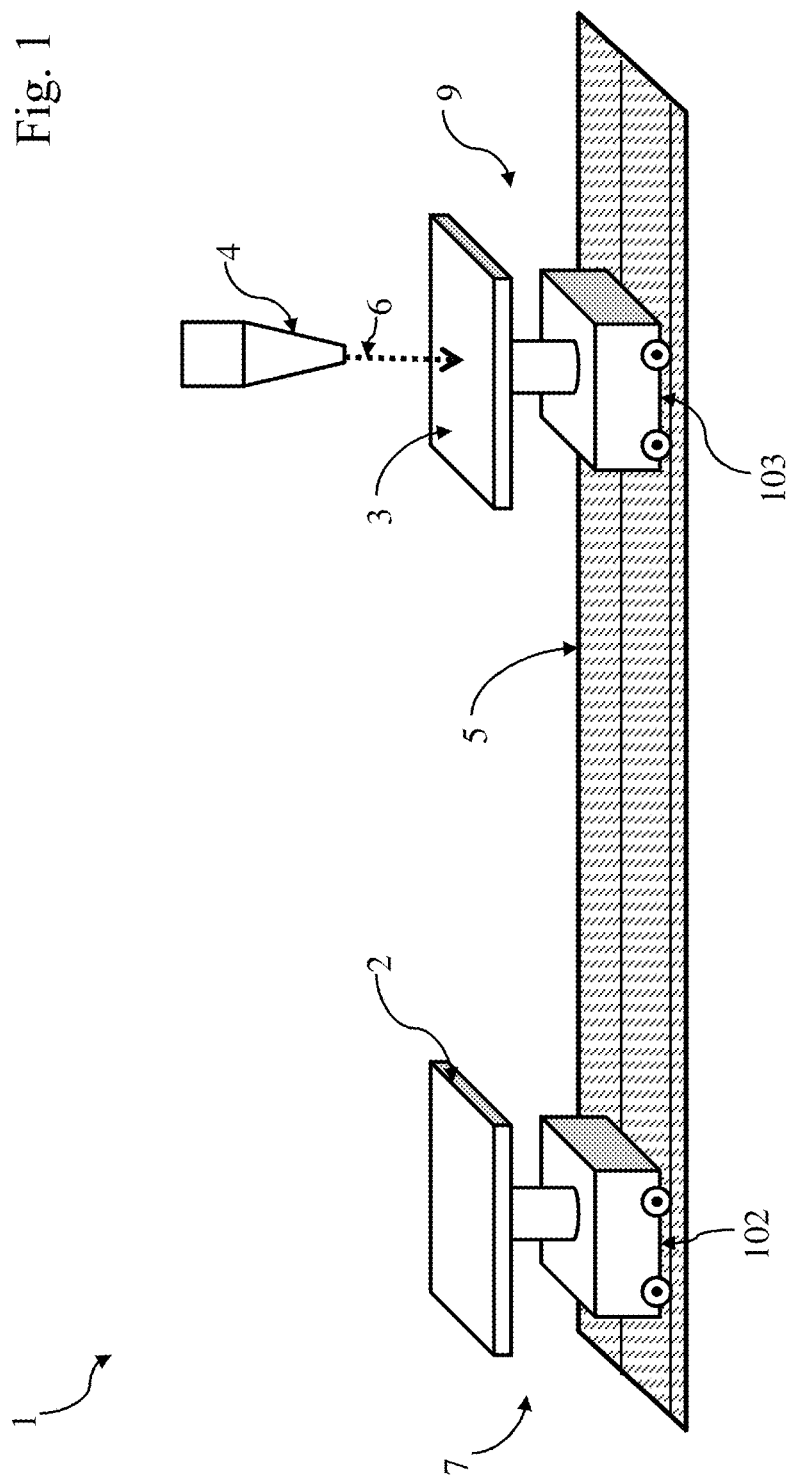
FIG. 1 is a schematic drawing of a production line for layerwise manufacturing of tangible products.

In FIG. 1. a schematic drawing of a production line for layerwise manufacturing of tangible products is shown. The production line (1) comprises at least two movable building platforms. This first (2) and second (3) movable building platform are suitable for carrying a tangible product. More in particular the platforms are suitable for carrying a product made by layerwise manufacturing. The production line further comprises a deposition head (4) for depositing a layer of construction material on the building platforms.

The deposition head must be suitable for depositing the material or materials out of which the product has to be made. In other words, one has to tune the deposition technology and the materials to be used. If a certain material providing device or technology is preferred for the layerwise manufacturing, then a suitable construction material has to be found. Likewise, a proper material depositing device or technology has to be found if a certain material or class of materials is preferred. A proper material depositing device may be an inkjet printing head suitable for an ink that can be used for layerwise manufacturing. Examples of such inks are solvent based inks comprising a polymer solution or inks comprising a curable resin. Advantageous are resins that are curable by electromagnetic radiation, in particular light. Often, resins that are curable by ultraviolet light are preferred because they can be applied under normal environmental condition, viz. visible light, without being cured unwanted. UV curable resins have the advantage that they will not block a nozzle where other inks do so due to solidification, viz. drying, of the ink by evaporation of the solvent. Further, UV curable inks often have a long shelf life. A suitable ink may be a dispersion of solid particles in a liquid polymer solution or curable resin. The particles may be metallic particles that eventually can be sintered after the solvent has evaporated or after the resin is cured. It is also possible to use materials, for example waxes, that are in a liquid state when heated and in a solid state at lower temperatures. For depositing such materials, the deposition head may comprise heating means, for example an electrical heating wire.

The deposition head can be any type of material providing device arranged to deposit material layerwise on a building platform. The deposition head may be of a type that provides a continuous layer of material, for example a spray gun or a coating curtain. Preferably the deposition head is a printing head providing droplets of material to the building platform, for example an inkjet printing device. Such a droplet providing device may be a continuous inkjet device which ejects droplets continuously in time or a droplet on demand device. The deposition head may also be a powder dispenser. The deposition head may be a scanning deposition head that can move in such a way that material can be deposited on different places of the building platform. Preferably, such a scanning deposition device allows a beam of material to be directed towards the different positions on a building platform with a scanning speed that is much higher than the conveyor speed. Such scanning device allows making complex patterns while the building platform is moving. Typically, the deposition head may be suited to deposit layers of a thickness between 1 micrometre (μm) and 1 millimetre (mm), more in particular between 5 micrometre and 500 micrometre, or even more particular between 10 micrometre and 200 micrometre. The inventors advantageously deposited layers of a thickness between 30 micrometre and 80 micrometre. The invention is, however, not limited to such layer thicknesses. Layer thicknesses of less than 1 micrometre (μm) are feasible, for example by deposition techniques like atomic layer deposition. Because such small layer thicknesses will require a huge number of layers to obtain a product with macroscopic dimensions, such thin layers may in particular be of interest for the addition of layers to semi-finished products or as a functional layer in or on the product. The layer thicknesses may be larger than 1 millimetre (mm), but products composed of such layers have a very rough structure and therefore usually will require additional processing, for example polishing. Further, the solidification of such thick layers may be cumbersome.

To allow manufacturing products with detailed structures, the lateral resolution of the deposition process should be high. Among others, this lateral resolution is determined by the type of deposition head. In embodiments where material is deposited as a continuous layer of construction material, this layer has to be solidified in the required shape by solidification means that are provided locally. In case the construction material has to be solidified with electromagnetic radiation, for example UV light, this radiation can be provided locally in several ways. For example, a mask, preferably a programmable mask, can be used to subject a predefined part of the layer to the radiation. Instead of a mask, a matrix with individually addressable light sources, for example light emitting diodes or laser diodes, can be used. Another way of providing light in the required pattern is a scanning laser or moving mirrors for directing the light in the proper direction. The resolution of the shaping obtained may be lower than 10 micrometre or even lower than 1 micrometre. However, for certain products, the resolution of 100 or 300 micrometre may satisfy.

When the two-dimensional structure is determined by a printing process, the resolution may be lower than 100 micrometre, or more in particular lower than 10 micrometre. It is appreciated that not all deposition heads of a production line comprising multiple deposition heads need to have the same resolution. The type of deposition head, the material to be deposited and the functionality of the deposited layer in the product to be fabricated will, among other parameters, determine what resolution is required and feasible.

Because using a printing head is a preferred embodiment for depositing the construction material, the word deposition head is used here. It is appreciated, however, that the use of this word is not intended to limit the invention to any specific material depositing device or technology. A deposition head is any kind of device that is suitable for depositing a material on a building platform, on a previously deposited layer carried by the platform, or on a substrate or other object or product carried by the building platform. So it includes among many others, atomic layer deposition which is a technique that can be used to apply thin layers of specific materials.

Where in the following reference is made to the deposition of a material onto a building platform or of placing an object on the platform, this includes the deposition and placing on the platform itself, on a substrate or object or product carried by the platform, and on previously deposited layers.

When reference is made to a product made by layerwise manufacturing on a building platform, it is appreciated that this includes the situation in which the building platform carries multiple products. The products on a single building platform may have the same geometry or different geometries. Because such separate products are located on the same building platform, they will have a certain resemblance, more in particular a similar layered structure. The production of a product may start with depositing a first layer of the construction material on the building platform. However, the building platform may be carrying a substrate or other product on which the first layer is deposited. Using a substrate may be advantageous for removing the finished product from the production line, more in particular from the building platform. When reference is made to depositing on a building platform, this includes depositing on a substrate, on a product or on a previously deposited layer on the platform.

Figure 12:
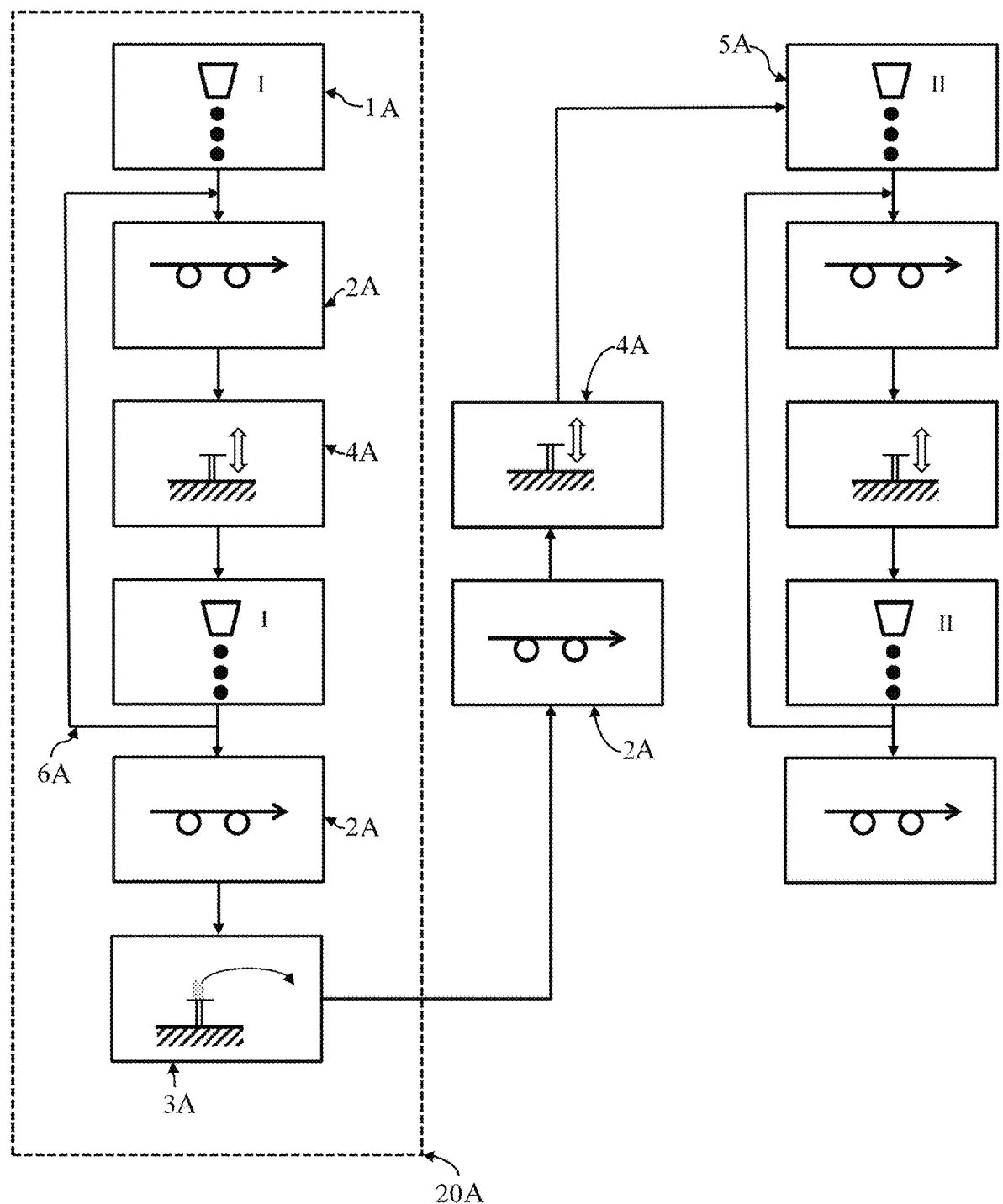
FIG. 12 is a flow diagram illustrating an embodiment of the method for making several tangible products according to the invention.
Figure 13:
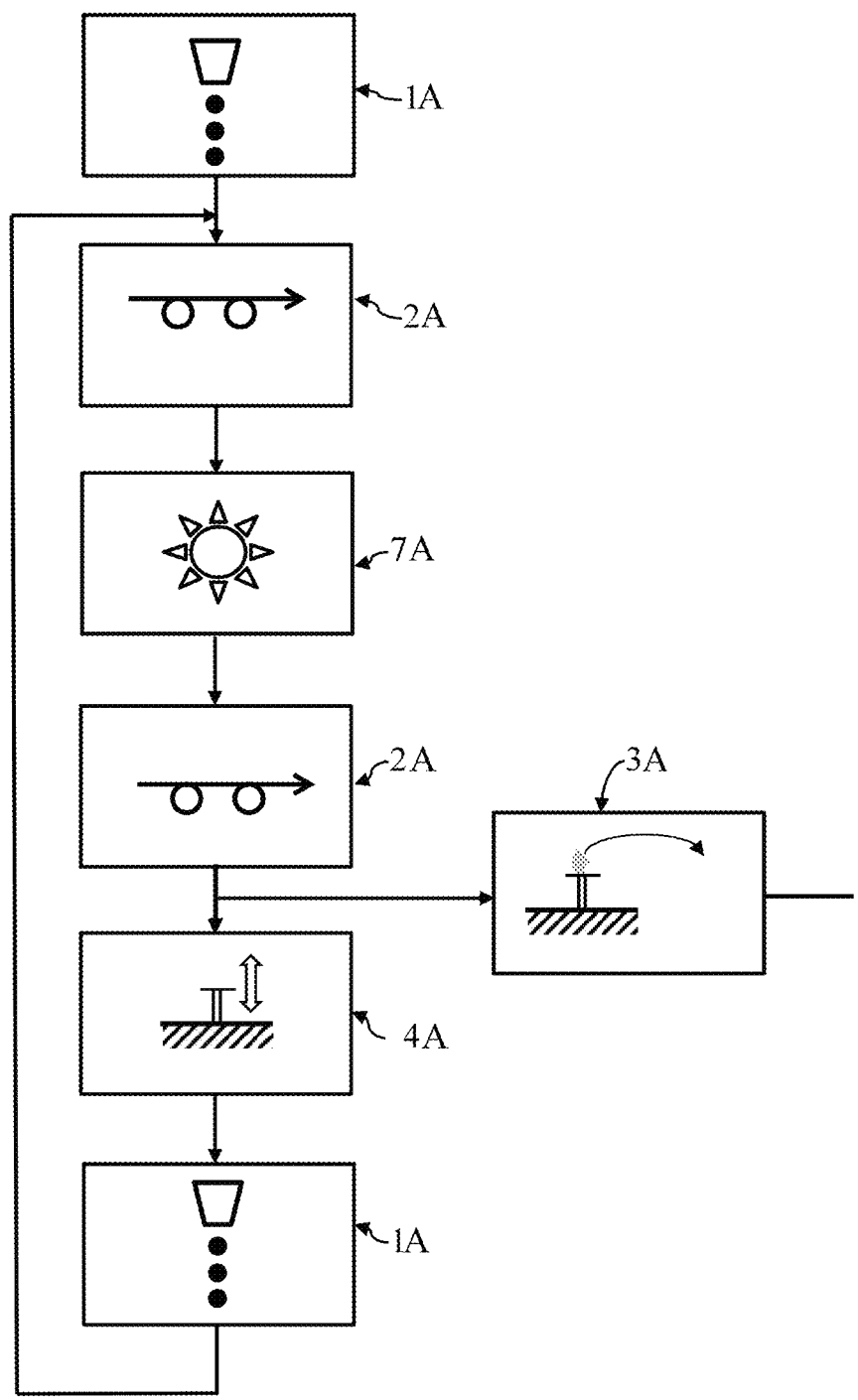
FIG. 13 is a flow diagram illustrating an embodiment of the method comprising a step of solidification.

Another embodiment of the method is discussed with reference to FIG. 13. In this figure, only the production process for one product is shown. Thus, this figure may replace the method steps within the box (20A) in FIG. 12. This other embodiment of the method for making tangible products by layerwise manufacturing comprises a step (7A) of solidifying the construction material in a predefined pattern after the construction material is provided to the building platform. Although it is possible to deposit construction material that solidifies in a predefined pattern without further measures, for example because the solvent of the ink evaporates fast or because the two-component ink solidifies in short time, many construction materials as deposited require an additional solidification step. In case that the construction material has been deposited in a layer of the required shape, the solidifying step can for example be a heating of the layer or a curing by electromagnetic radiation, for example UV light. Because the layer of construction material has already the required shape, the solidification means have not to be provided in a pattern but may be provided homogenously over the whole target area or even a larger area. This allows for example thermal heating by infrared radiation or heating by hot air.

In case that the deposited layer is a continuous layer of construction material, this layer has to be solidified in the required shape by solidification means that are provided locally. In case that the construction material has to be solidified with electromagnetic radiation, for example UV light, this radiation can be provided locally in several ways. For example, a mask, preferably a programmable mask, can be used to subject a predefined part of the layer to the radiation. Instead of a mask a matrix with individually addressable light sources, for example light emitting diodes, can be used. Another way of providing light in the required pattern is a scanning laser or moving mirrors for directing the light in the proper direction.

Preferably, the method is performed with equipment comprising several platforms because then the advantages of this method are exploited optimally. In case that several platforms are used for implementing the method, the steps may be similar to those described above, replacing the word platform by the $n^{th}$ platform, where n is the sequential number of the platform. However, the method according to the invention does not require that all the platforms are used for the manufacturing of a layered product. For example, some of the platforms may be kept empty. Neither is it required that the removal of the products is performed in the sequence of the arrangement of the platforms. Actually, the method can be applied while operating each of the platforms independently of all others.

Figure 14:
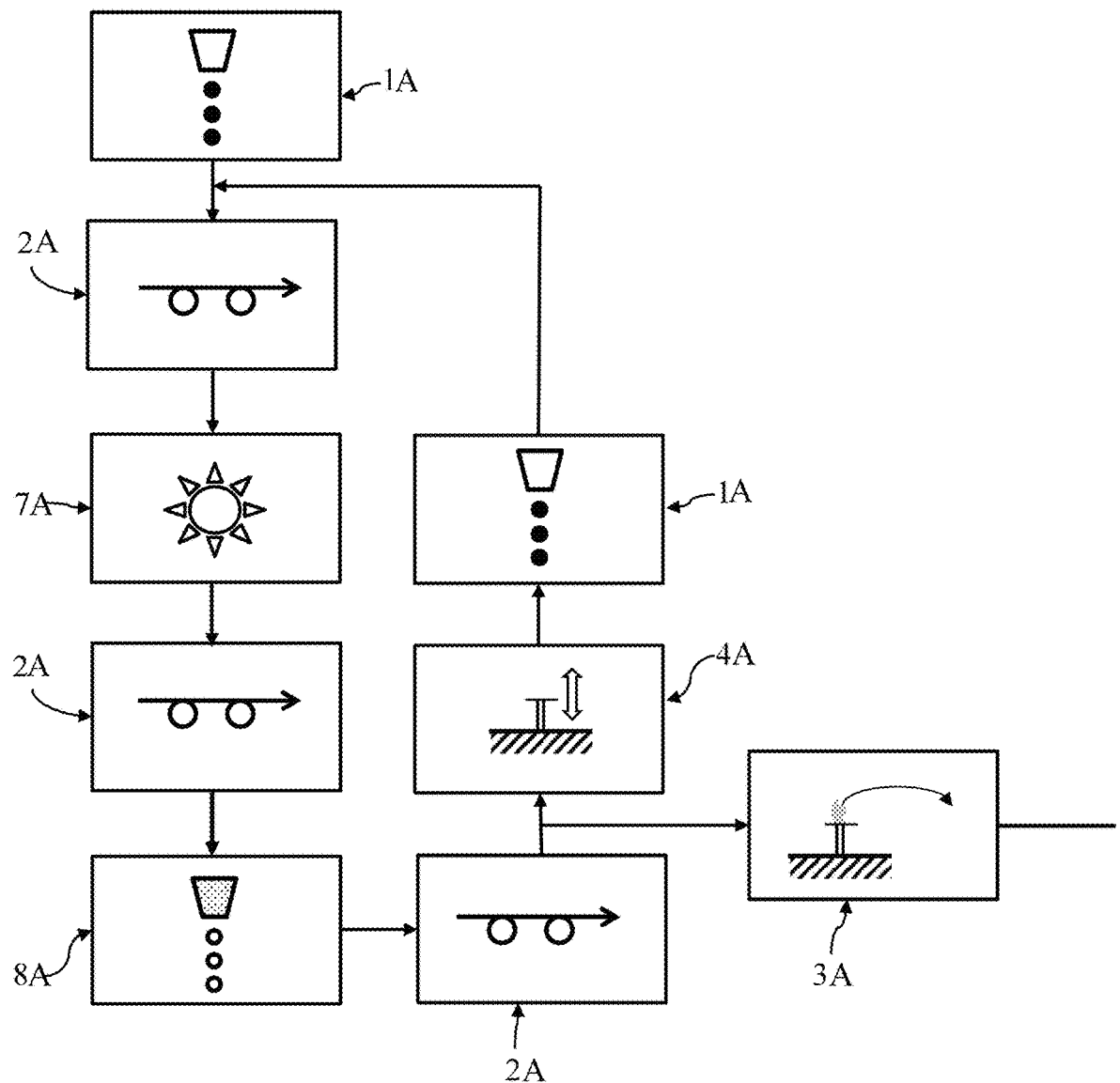
FIG. 14 is a flow diagram illustrating an embodiment of the method comprising providing a supporting material.

Another embodiment of the method, shown in FIG. 14, comprises a step (8A) of providing a supporting material for supporting construction material. This embodiment is discussed here with reference to FIG. 14. Here again, only a part of the method steps are shown, namely the steps for one product. The embodiment of the method is in particular of interest for making products in which parts of subsequent layers are not supported by an underlying, previously deposited layer, for example in case that the product comprises holes or overhanging parts. In certain embodiments of the method, the non-solidified part of the construction material can fulfill the function of supporting material, for example when the construction material is a powder with a certain degree of coherency. Using the construction material as supporting material has several disadvantages. One of the disadvantages is that the construction materials, which are developed for layerwise manufacturing, often are rather expensive. Sometimes the not-solidified construction material can be reused, but this requires special measures such as cleaning. An advantage of using a different material for supporting is that the supporting material can be selected from a class of materials with properties that make them especially suitable for supporting. In particular, materials that can easily be removed from the product, for example by solving them in solvents that are not detrimental to the construction material, like water.

According to the method steps shown in FIG. 14, the construction material provided in step (1A) is solidified in a separate step (7A). However, such a step may be absent in case that construction material is for example a two component systems that solidifies without a special step. In particular, such a two component construction material may solidify as a result of its exposure to normal environmental conditions. Although not shown in FIG. 14, the supporting material may be subject to a solidification process, which solidification may of course not prevent later removal of the material if required. Usually, the supporting material should be removable after the product is finished. However, for special products it might be acceptable that the supporting material remains in the product. For example, if the supporting material is a lightweight material not visible from the outside of the finished product.

The supporting material can be deposited either after a layer of construction material has been deposited in the predefined shape or before. Because the spaces filled with the construction material and the supporting material are complementary, they may form a continuous layer of which a part will be solidified, viz. the part being the construction material. The layer as whole, viz. the solidified part and the part composed of supporting material, is the basis on which a subsequent layer can be deposited.

A supporting structure can also be obtained from the construction material or from a —different—construction material that is solidified. Such a supporting structure may for example have a honeycomb geometry or other type of structure that can easily be broken apart later.

Figure 15:
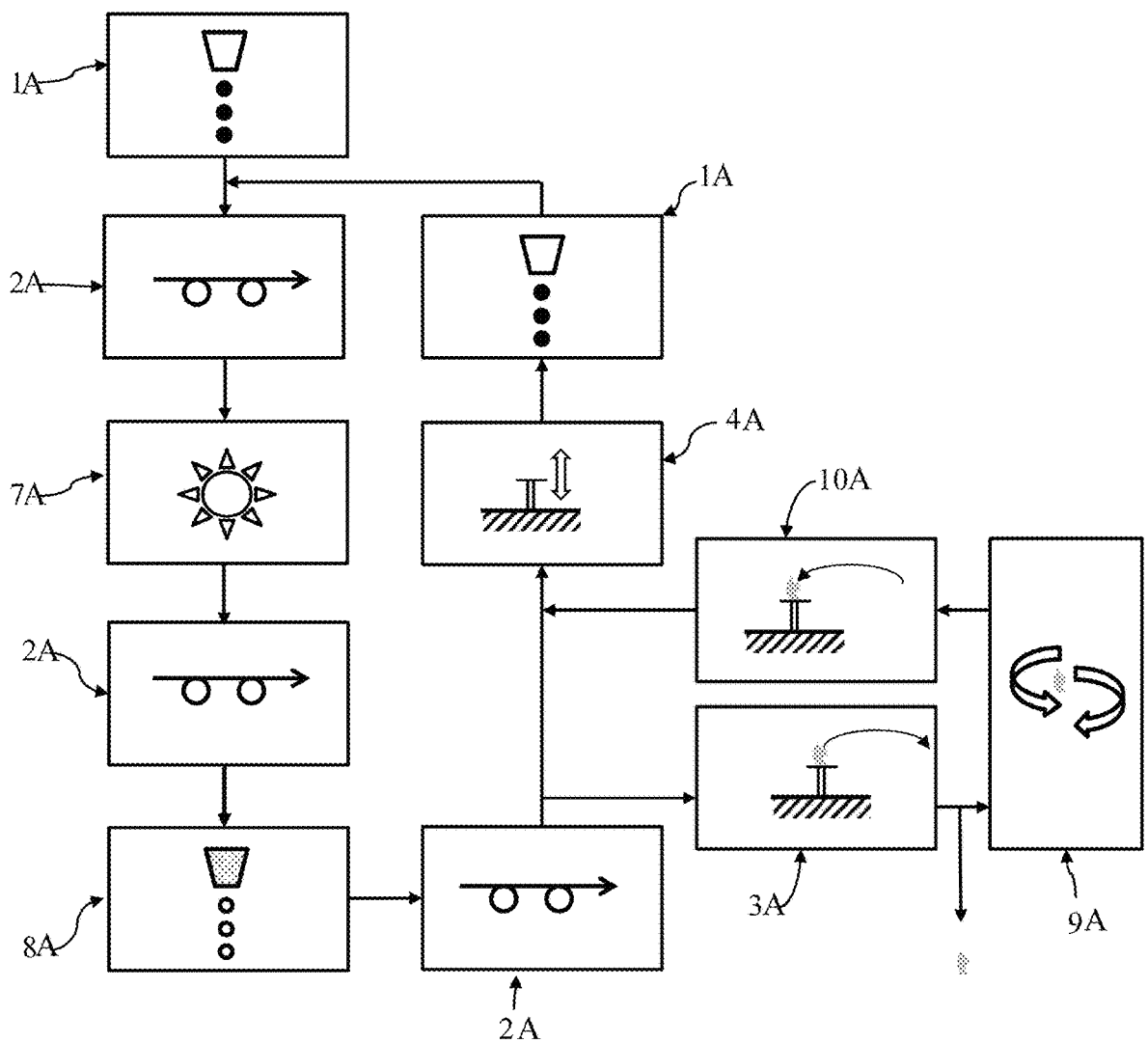
FIG. 15 is a flow diagram illustrating an embodiment of the method comprising further processing and replacing the product.

In a further embodiment of the method is shown in FIG. 15. This embodiment comprises the step of further processing (9A) the first product after it has been removed from the building platform. This embodiment further comprises the step of placing (10A) this processed first product back to a building platform conveyed by the conveyor. This embodiment is based on the insight that many products that are manufactured layerwise need further processing as an intermediate step between two steps of layerwise manufacturing. Such further processing may be for example be a surface treatment. Examples of surface treatments are removal of material, for example by etching or mechanical tooling like polishing. The surface treatment may also be the addition of material, for example by painting, thermal evaporation, electrochemical deposition or other atomic layer deposition techniques. The further processing may also comprise adding or inserting electronic components like for example computer chips and light emitting diodes. It may also comprise the insertion of certain products that can better made by techniques other than layerwise manufacturing, like for example photovoltaic cells, MEMS devices or injection moulded parts.

Figure 2:
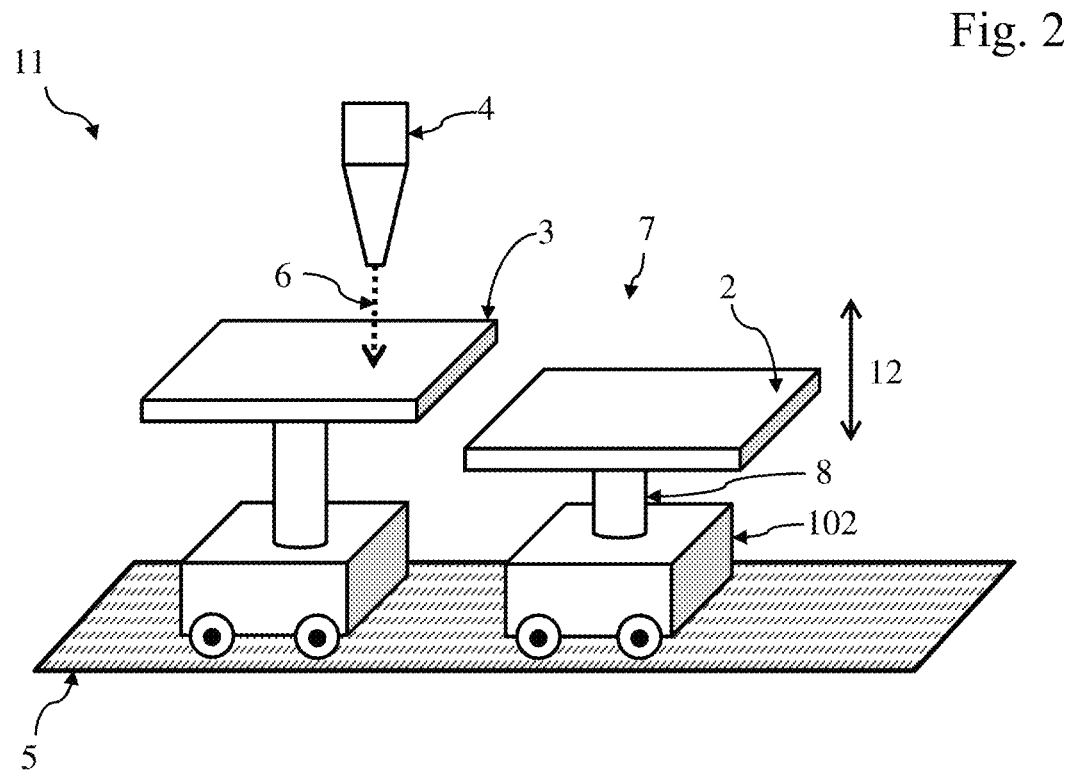
FIG. 2 is a schematic drawing of two building platforms comprising height adjustment means.

To allow the deposition on the building platforms, each platform and the deposition head are movable relative to each other. For this purpose, the production line (1), as shown in FIGS. 1 and 2, comprises a conveyor (5) for conveying first and second movable carriers (7, 9) with first and second building platforms (2, 3) towards the deposition head (4) and away from the deposition head (4) repeatedly. When reference is made to a moving platform, this includes the situation in which a platform is being moved by the transporter (102) or by the conveyor (5). The deposition head (4) is positioned relative to the conveyor (5) so that the deposition head (4) can deposit material on the building platforms (2, 3). After a first platform (2) is moved away from the deposition head (4), the head can be used for depositing a layer on a second platform (3). The repeating movement of the platforms (2, 3) to and away from the deposition head (4) allows layers to be subsequently deposited on top of each other in order to make the desired product. In addition to being movable relative to the deposition head (4), the platforms (2, 3) are also moveable relative to each other along the conveyor (5). Thus, the platforms (2, 3) are movable relative to the conveyor (5). This relative movement can be realized in different ways. The production line (1) may, for example, comprise means for mechanical locking and unlocking of the platforms (2, 3) from the conveyor (5). When a platform (2, 3) is unlocked from a moving conveyor (5), the platform may remain stationary to allow certain handling of the product on the platform. Such a stationary position may, for example, also be favourable for picking a finished product from the platform.

The production line comprises one or more building platforms (2, 3) for carrying layers of material during the manufacturing of a product as shown in the FIGS. 1 and 2. The platforms (2, 3) are displaceable relative to the conveyor (5) in the building direction (12). In this embodiment, the building platforms (2, 3) can be displaced around their middle vertical position both upwards and downwards, viz. away from the conveyor (5) and towards the conveyor (5).

The conveyor (5) moves the building platforms (2, 3) to and from in such a way that the building platforms (2, 3) is situated between the deposition head (4) and the conveyor (5) at regular time intervals. In a preferred embodiment, the deposition head (4) is fixed at an elevation above the conveyor (5) in such a way that material falls or is ejected in the direction (6) of a building platform situated below the deposition head (4). During a selected time interval, the building platform will receive the material. After a layer is deposited, the platform (2, 3) can be moved downwards to keep the distance between the deposition head (4) and the target area of the material constant. This provides the same distance between the top of the already deposited layers and the deposition head (4) each time the platform (2, 3) passes under the deposition head (4).

For accurate manufacturing, the distance between the deposition head and the target area, which is the area on which the material is deposited, may need to be the same for all layers during the deposition of the material. For the first layer, the target area may be the building platform or any type of substrate placed on the platform. For subsequent layers, the target area is defined by the previously deposited layer, which previously deposited layer may comprise a solidified layer and supporting parts. The target area may also be an object that has been inserted to be encapsulated, which object may be produced by layerwise manufacturing or otherwise. In order to keep the distance between the deposition head and the target area constant, the production line may comprise means for adjusting the height of a platform as will be discussed here with reference to FIG. 2. The height of a platform is defined here as the distance between the platform and the transporter in a direction parallel to the building direction, viz. parallel to the deposition direction (6) during use of the production line. Usually, the direction of displacement to realize the height adjustment will be the vertical direction. To allow the distance between the deposition head and the target area to be varied, the embodiment of the carrier shown in FIG. 2 comprises height adjustment means (8). The height adjustment means are situated between the building platform (2) and the transporter (102) in order to displace the building platform relative to the conveyor (5) and the transporter in a direction (12) parallel to the deposition direction. The height of a platform may be adjusted for example by an electromotor and a worm wheel or a stepping motor, a piezoelectric actuator, or pneumatically. After having adjusted the height of a building platform, a new layer may be deposited on top of the previously deposited layer. The process of depositing a layer, moving it away from the deposition head, displacing the platform relative to the conveyor, and providing the layer to the same deposition head again, is repeated until the product is finished.

The distance between the deposition head and the target area may also be adjusted by displacing the deposition head relative to the conveyor. However, such a construction has the disadvantage that the deposition head has to move to its new position in a very short time, namely the time that it takes to move a building platform away from the deposition and to move another platform to a position where a layer can be deposited. Typically, this may take only a few milliseconds. The time of moving the platform away from the deposition head and again back to the deposition head, is much larger. Even when taking into account that the speed of a platform during this movement may be high in comparison to the speed during for example depositing a layer of material, there may still lapse several seconds before the platform arrives again at the deposition head. This leaves sufficient time to adjust the height of the building platform relative to the conveyor.

It may be preferred to adjust the distance between the deposition head and the target area after deposition of every layer to have the same distance between the top of the already deposited layers and the deposition head each time the building platform passes the deposition head. However, if the distance between the deposition head and the target area is not very critical, the height of the platform need not to be adjusted before every passage and it may be sufficient to adjust the height of the building platform not after the deposition of each layer but only when a few layers have been deposited, for example five layers. In case that the height is not adjusted after each deposited layer, the timing of the ejection of material out of the deposition head may need adjustment because of the following. The material needs some time to reach the deposition area after being ejected by the deposition head. During this time, the building platform will move and consequently the position where the droplet of the material will reach the deposition area will change when the distance between deposition head and the deposition area changes. If the production line comprises more than one deposition head or if it comprises in addition to the deposition head another type of device, the height of the platform may be adjusted before the building platform approaches such other deposition head or second device. Such an adjustment need not be a lowering but may also be a movement in the upwards direction, for example because the device is a cutting knife or a polishing device.

For curing a deposited layer, the production line may comprise a UV source (34). Such an UV source may provide a pattern of UV radiation on the deposition area by for example a mask, preferably a programmable mask, or by an array of light emitting diodes or laser diodes.

The displacement of a building platform after the deposition of a layer or before the deposition of an additional layer, will usually be downwards. If, however, for example another type of material has to be deposited on top of the previously deposited layer, than, possibly, the distance between the deposition head and the building platform needs to be smaller. In such a case, the platform may be displaced upwards. In other situations, the platform may not need to be displaced at all, for example because the subsequent layer is to be deposited in the same building plane at positions where there is no material of the previously deposited layer. Apart from the case where holes in a previous layer have to be filled, a subsequent layer may also be deposited into the previous layer, so injecting the previous layer with another material.

Preferably, the production line comprises two or more building platforms. Multiple building platforms increases the capabilities of the production line. During use of a production line comprising several building platforms, there may be products in different stages of construction on the conveyor resulting in very flexible production. Several platforms may also be advantageous, when for example the step of picking the product from the building requires relatively extensive time, more in particular when a step requires the conveyor to be slowed down. In such a case, one may prefer to make products on the different platforms and after the last product is finished, slow down the conveyor to pick the products form the building platforms.

To obtain a flexible production line that allows producing different products and to produce products at different stages of production simultaneously, the different platforms may be displaceable independent of each other in the building direction relative to the conveyor.

In a preferred embodiment of the production line comprising multiple building platforms, the height of all the platforms is adjustable independent of the height of other platforms. Independent does not only mean that the height of a platform may be different from a neighbouring platform but also that the height need not be related to the height of a neighbouring platform. The heights of subsequent platforms is not determined by the height of a neighbouring platform but by the product that is to be manufactured on a specific platform. An advantage of such independent adjustable platforms is that there is a large degree of freedom in making different products quasi-simultaneously.

Figure 3:
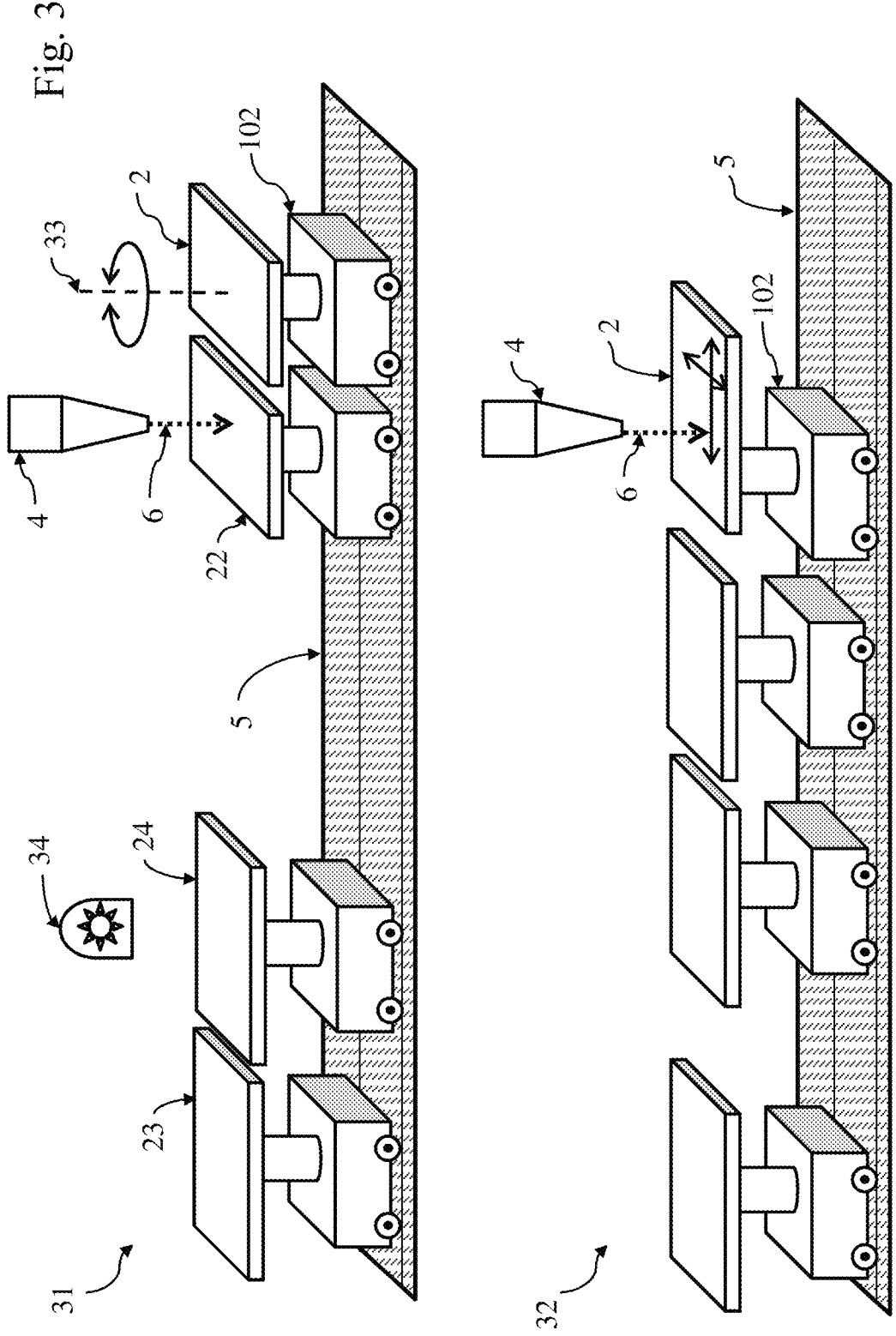
FIG. 3 is a schematic drawing of two production lines comprising platforms that are movable relative to a transporter.

A building platform may be at a fixed position on a transporter, but it may be advantageous if the building platform is movable relative to the transporter. As discussed above, the platform may be movable in a direction parallel to the deposition direction by height adjustment means. In addition to or instead of this movement in the building direction, the building platform may be movable a plane perpendicular to the deposition direction as will be elucidated with reference to FIG. 3. In FIG. 3, two embodiments of such a production line are shown. In one embodiment (31), one or more of the building platforms (2) are rotatable in said plane, so around a line (33) that is in parallel with the deposition direction (6). In another embodiment (32), the production line comprises a building platform that is transferable in a plane perpendicular to the deposition direction (6). Both embodiments have in common that the orientation of the product on such a platform can be varied relative to the conveyor (5), the deposition head (4) and an eventual working station. Further, the orientation of the platform can be varied relative to another platform. Variation of the orientation of the platform is of particular interest in case that the platforms have a rectangular, non-square shape. In a production line comprising such rectangular platforms, neighbouring platforms may be oriented such that the platforms (2, 22) are facing each other with a long side or that shorter sides of the platforms (23, 24) are facing each other. When the longer sides of the platforms are facing, a larger number of platforms can be placed along certain trajectory of the conveyor than in the situation where the short sides are facing each other. The platforms may be positioned with long sides facing when the platforms are for example parked while waiting for deposition of a layer by the deposition head or while waiting for entering a working station. The length of such a waiting row preferably is as short as possible. On the other hand, the width, viz. the dimension of the platform perpendicular to the conveying direction, is preferred to be as small as possible during deposition of a layer by a printing head. When a printing head is used for the deposition of a layer, either patterned or not, the platform and the printing head may be moving relative to each other in the moving or conveying direction. The dimension of the deposited layer of the product under construction in the moving direction is not determined by the size of the printing head but by the speed of the platform and the time during which the head is ejecting construction material onto the building platform. The dimension in the lateral direction perpendicular to the conveying direction, however, are limited by the dimensions of the printing head or the number of printing heads in that direction. So, it may be preferred to orient the platform such that it is moving relative to the printing head with a smaller side in front, viz. with the long side parallel to the moving direction. When the deposition head ejects a single jet of material or a limited number of jets that is not sufficient to cover the whole cross-section of the product to be made, the platform and the head have to move relative to each other in two directions in order to create a layer on the platform or on an already deposited layer. Such a movement can be realized by moving the platform, the deposition head, or both, relative to the conveyor in a plane perpendicular to the deposition direction.

The velocity of a building platform may be variable in time and may depend on the position of the platform on the trajectory. This will be illustrated with reference to FIG. 4. The upper part of this figure shows schematically an embodiment of the production line comprising nine identical building platforms (2, 401-408) that are movable along the conveyor (5). This embodiment of the production line further comprises a deposition head (4) and a curing station (34) for curing a deposited layer. This embodiment of the production line further comprises an input line (415) for carriers and an output line for finished products (425). Actually, this drawing is a snapshot at a certain moment in time. More specifically, it is a snapshot at the time that one of the building platforms (407) is at the position indicated by "D". After a layer of construction material has been deposited on a building platform, the platform moves away from the deposition head to the curing station. After the layer is cured, the platform moves towards the deposition head to allow the deposition of another layer of construction material. This process is repeated until the desired product is manufactured. The finished product can be taken from the production line by stopping the movement of the carrier that comprises the building platform from which the product has to be taken. The production line may also comprise a pick and place robot that can pick the product from the platform, either during movement of the building platform or when the platform stand still.

Figure 4:
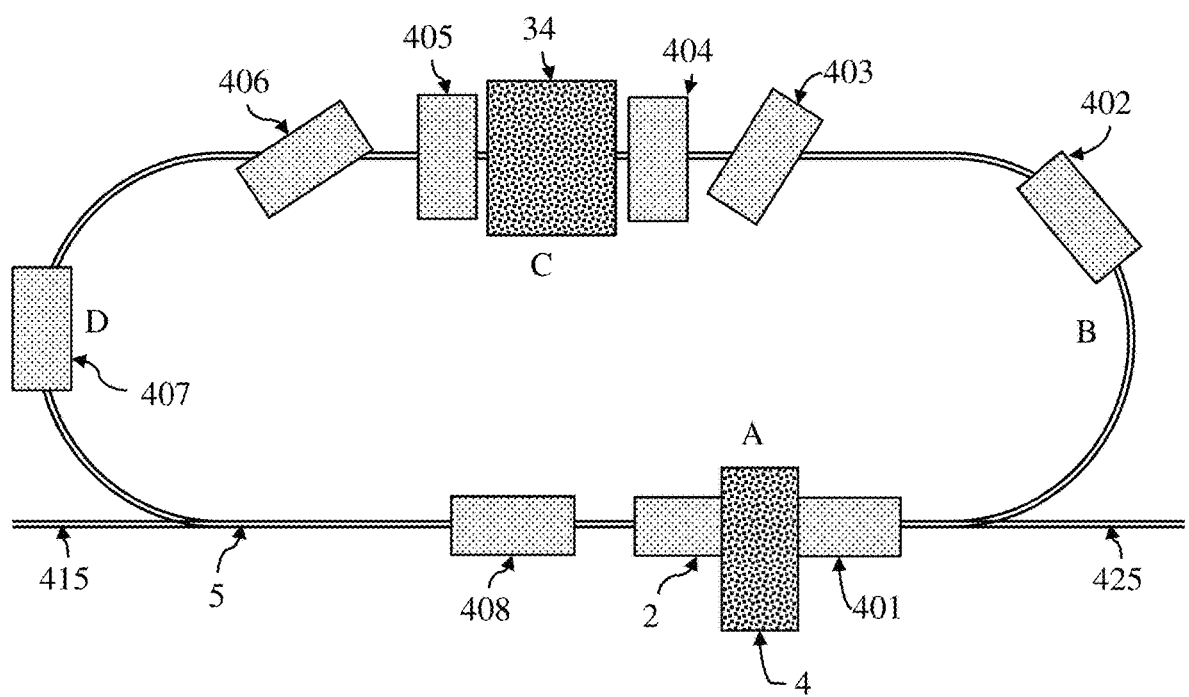
FIG. 4 is a schematic drawing of an embodiment of the production line with multiple movable platforms and a graph of a possible velocity distribution of a platform.
Figure 4:
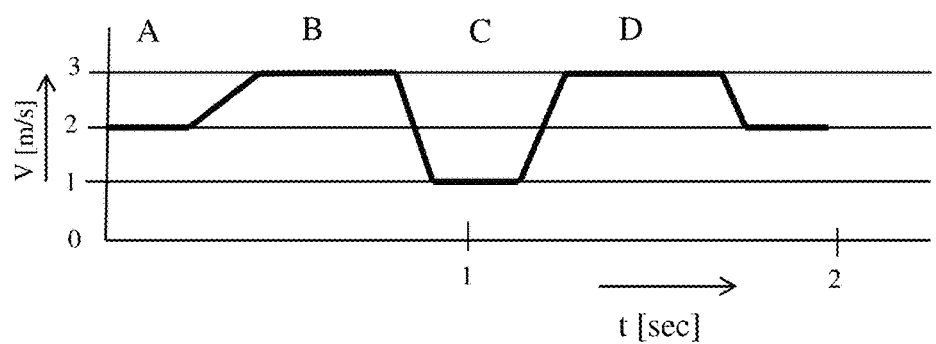

The lower part of FIG. 4 shows an example of the velocity of a building platform as a function of time. Different parts of the trajectory of a platform as defined by the conveyor are indicated with the letters A, B, C, and D. The building platforms in this embodiment can rotate in the plane perpendicular to the deposition direction, viz. in the plane of the drawing. This rotation may preferably take place during the movement of the platform. However, it is also possible to stop the building platform and rotate the platform in the desired position when it stand still. In the example shown in FIG. 4, the velocity of the platform is lowest during the curing step (C). Here, the velocity is chosen to be 1 m/s. In the trajectory (B) between deposition (A) and curing (C) and in the trajectory (D) between curing (C) and deposition (A) of a subsequent layer, the velocity is highest, here 3 m/s. During deposition (A) of the material, the platform has an intermediate velocity of 2 m/s. It may be preferred to change the orientation of the platform between the deposition and the curing. This may, for example, be done to reduce the length of a waiting row before the curing station or for another reason. In FIG. 4, three of the platforms (403, 406, 408) are rotating between a position in which a short side of the rectangular platform is the direction of movement (2, 401, 402, 407) and a position in which a long side of the platform is in the direction of movement (404, 405).

The conveyor of the production line may be finite or endless. Whether finite or endless, preferably, such a conveyor is configured as to convey the building platforms such that that building platforms remains horizontal during the production process, viz. that the building platforms extend in a plane that is perpendicular to the gravitational force. This does not exclude that the building platforms move along a certain part of the trajectory in a direction that is parallel to the gravitational force. An advantage of keeping the building platforms horizontal is that powders and even liquids can be deposited on the conveyor without falling off before the powder is fused to a solid layer of the product or the liquid is solidified.

Figure 11:
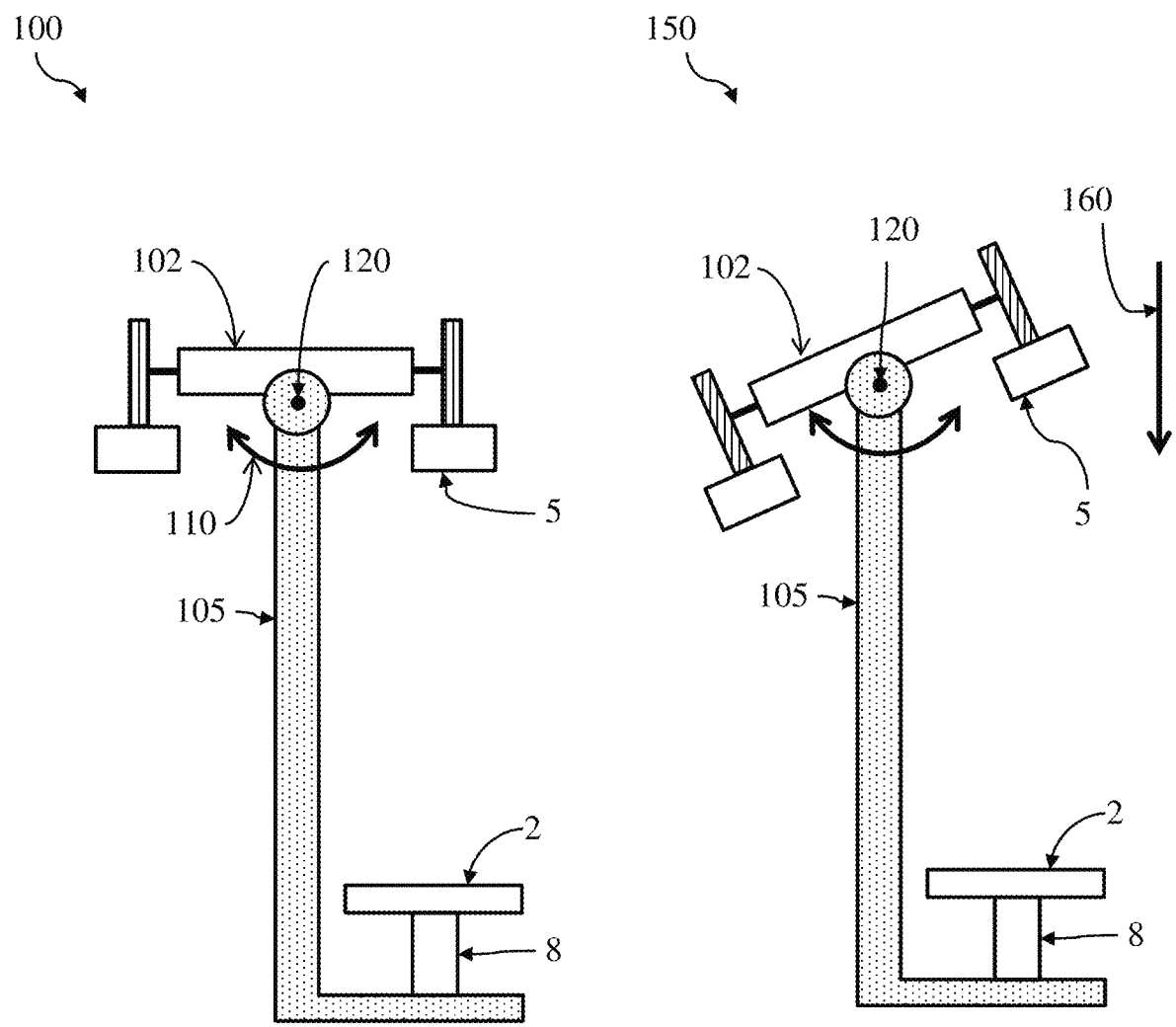
FIG. 11 is a schematic drawing of a carrier that allows the building platform to tilt in a curved trajectory.

In order to avoid the loss of material when the building platform tilts at the curved part of a trajectory, the production line may comprise means to adjust the building platform in such curved parts. The conveyor may for example comprise banked curves or the platform may be a swivelling building platform that is rotatable around a real or fictive axis. The platform may, however, be suspended in a carrier that allows the building platform to tilt when subject to the centrifugal force, automatically. A cross section of such a carrier (100) is shown in FIG. 11. The carrier is movable along the conveyor (5) in a direction perpendicular to the cross sectional plane. According to this embodiment of the carrier, the building platform (2) is mounted on a arm (105), which arm can pivot around an axis (120) relative to a transporter (102). The height of the platform can be adjusted relative to the arm by height adjustment means (8), for example an actuator. When the carrier, moving in a direction perpendicular to the drawing, is making a turn to the right or to the left, the centrifugal forces on the building platform will make the arm rotating around the axis and the building platform will tilt. Such a tilt may prevent the material on the platform to be flung away from the platform. This embodiment of the carrier may be combined with a conveyor comprising one or more banked curves as shown in the right hand drawing of FIG. 11. Here, the direction of the gravitational force is indicated by an arrow (160) to illustrate that the curve is banked. As mentioned before, banked curves can also be combined with other embodiments of the carrier, in particular embodiments where the height adjustment means (8) are fixed to the transporter.

When the conveyor is finite, the relative motion of the building platforms and the deposition head has to be switched a certain moment in time in order to deposit a subsequent layer on a previously deposited layer. This will be illustrated with reference to FIG. 3. If the embodiment of the production line (31) shown in FIG. 3 is assumed to comprise a finite conveyor (5) that does to extend beyond the drawing, the two platforms (2, 22) at the right hand side may move to the left while passing the deposition head (4). After all of the platforms (2, 22, 23, 24) pass the deposition head (4) and are located to the left of the deposition head (4), they have to move back to the right for the deposition of an additional layer by the deposition head (4). It will be appreciated that such a process takes time and that the order of the different platforms (2, 22, 23, 24) arriving at the deposition head (4) will be reversed after each turn. Of course, the platforms (2, 22, 23, 24) may be moved back to the right without depositing material, but only depositing material when the platforms are moving to the left in such a deposition line is not efficient. For this and other reasons, an endless conveyor that is configured in the shape of a disc or an endless belt, as shown in FIG. 4, is a preferred conveyor for conveying a building platform towards a deposition head and away from the deposition head.

Another advantage provided by an endless conveyor is that an endless conveyor makes it easier for a production line to use multiple platforms. Preferably, such a conveyor is configured as to convey products in a horizontal plane, viz. in a plane that is perpendicular to the gravitational force. An advantage of a horizontal endless conveyor is that the direction of gravitational force to which the products on the endless conveyor are subjected, does not change even during a continuous unidirectional movement of the conveyor. The gravitational force is in the same direction everywhere on the conveyor. Consequently, powders and even liquids can be deposited on the conveyor without falling off at another position of the conveyor.

Figure 5:
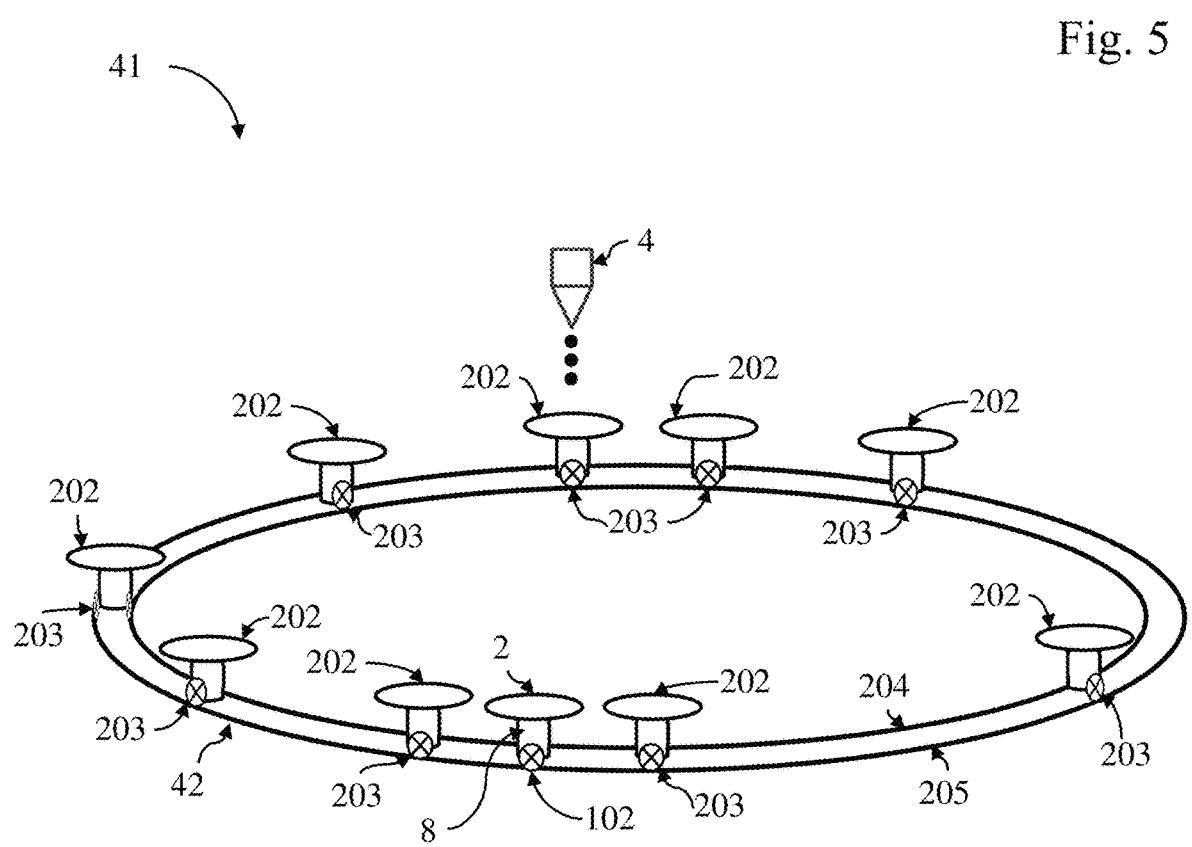
FIG. 5 is a schematic drawing of a production line wherein the conveyor is an endless conveyor.

A production line comprising an endless conveyor of which an embodiment is shown in FIG. 5 is in particular suited for conveying a large number of building platforms because each building platform moving unilaterally. This allows processes such as layer deposition to be performed repeatedly on a certain platform without requiring special measures. For products that are made out of one material, just one deposition head may be sufficient to make the product when an endless conveyor is used. This makes the production line much cheaper and less complex than systems such as the one disclosed in US patent application US2009/0076643 where many printing heads, or even a huge number of printing heads are needed, namely at least one printing head per layer.

The platforms on an endless conveyor may move for example in clock-wise direction and while doing so, each of the platform will repeatedly pass the deposition head (4) and the order of the platforms (2, 202) will always be the same, at least when all the platforms follow a single trajectory as shown in FIG. 5. The platforms may be locked and unlocked from the conveyor during some time. The platform will move with the same speed as the conveyor when the platform is locked to the moving conveyor. If on the other hand, the platform is unlocked from the moving conveyor, the platform may stand still. In such a situation, a locked and an unlocked platform will move relative to each other with the speed of the moving conveyor. However, in general such locking and unlocking will not be preferred and the speed of the carrier comprising the platform be solely be determined by the transporter (102, 203) moving relative to the conveyor. The transporters allow each of the carriers and thus the building platforms to be moved along the conveyor, or at least along a part of the conveyor, with a speed that need not to be the same as the speed of other platforms of the production line. Different types of carriers may be applied, just as is the case for a production line comprising a finite conveyor, including electric carriers on rolling wheels and carriers levitated and moving by magnetic fields. In fact, any type of carrier will satisfy if such carrier is suitable for following the trajectory of the conveyor. In many applications, the platforms on an endless conveyor will move unidirectional, viz. always in the same direction, for reasons mentioned above. However, the platforms may also reverse the moving direction. In a specific case, two building platforms may even move in opposite direction. Of course, this may being only the case during a short time because otherwise the platforms would collide with each other or with other platforms on the conveyor. Although a building platform may be placed at a fixed position to the transporter, it is preferred that the platform can move relative to the transporter as discussed before, in particular it is preferred that the height of a building platform can be adjusted.

Figure 6:
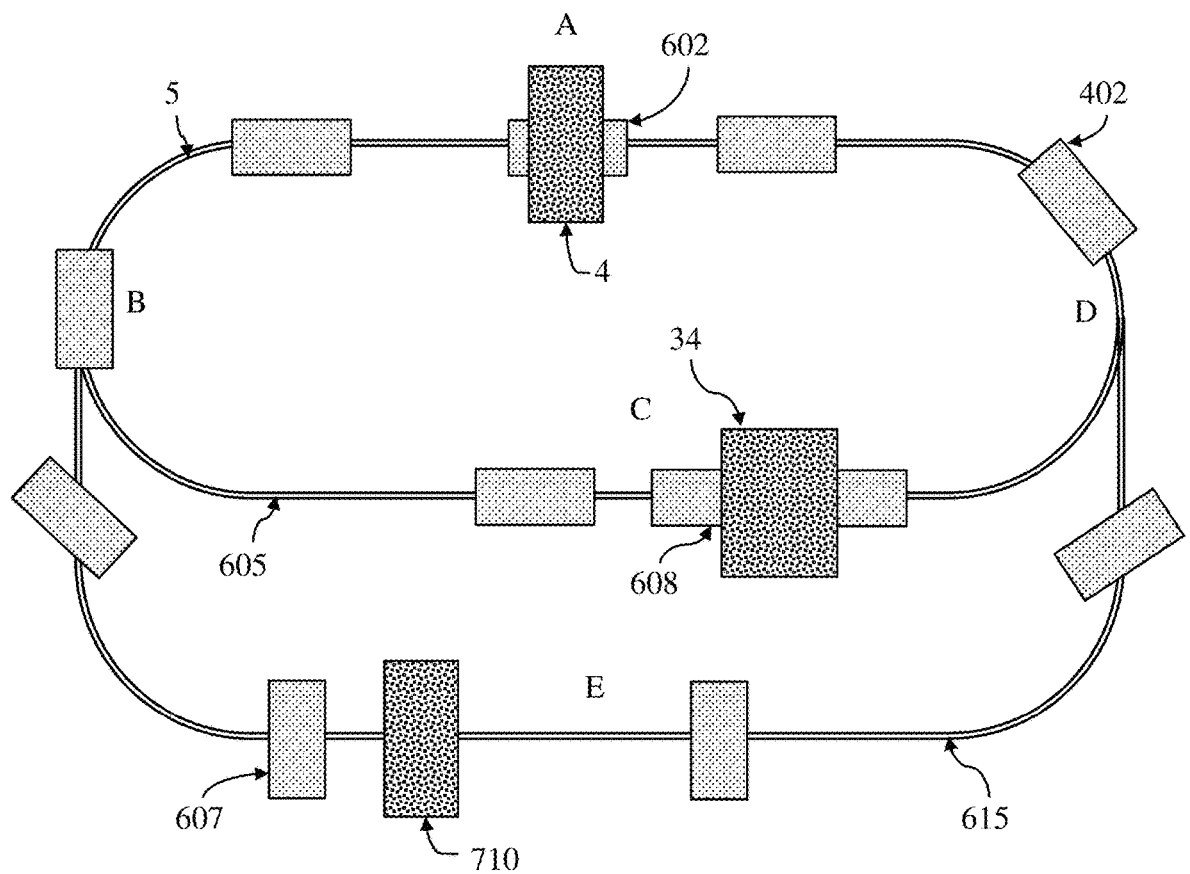
FIG. 6 is a schematic drawing of a conveyor with multiple trajectories.

An endless conveyor belt can be configured in a geometrical shape that allows optimal use of available space and it allows conveying the products along or even through all types of equipment, such as deposition, tooling, and heating equipment. If the trajectory of the platform as defined by the conveyor is curved, as is the case for a rotating disc or at parts of a conveyor belt, then there is a difference in the length of the trajectory at the inner curve (204) and at the outer curve (205). Compensating for this difference by adjusting the deposition of the material may be cumbersome. This may be a reason to prefer a conveyor belt comprising straight parts in its trajectory as is shown in FIGS. 4, 6, and 7.

The different embodiments of the production line described above may comprise one or more handling stations for handling a tangible product. Handling is defined as any activity that is performed on a product apart from depositing a layer of construction material and optionally curing such a layer. An embodiment of a production line (200) for layerwise manufacturing of tangible products is shown in FIG. 7. This figure will be used here to illustrate that many different types of equipment and devices can be placed around the conveyor, including handling stations.

Figure 7:
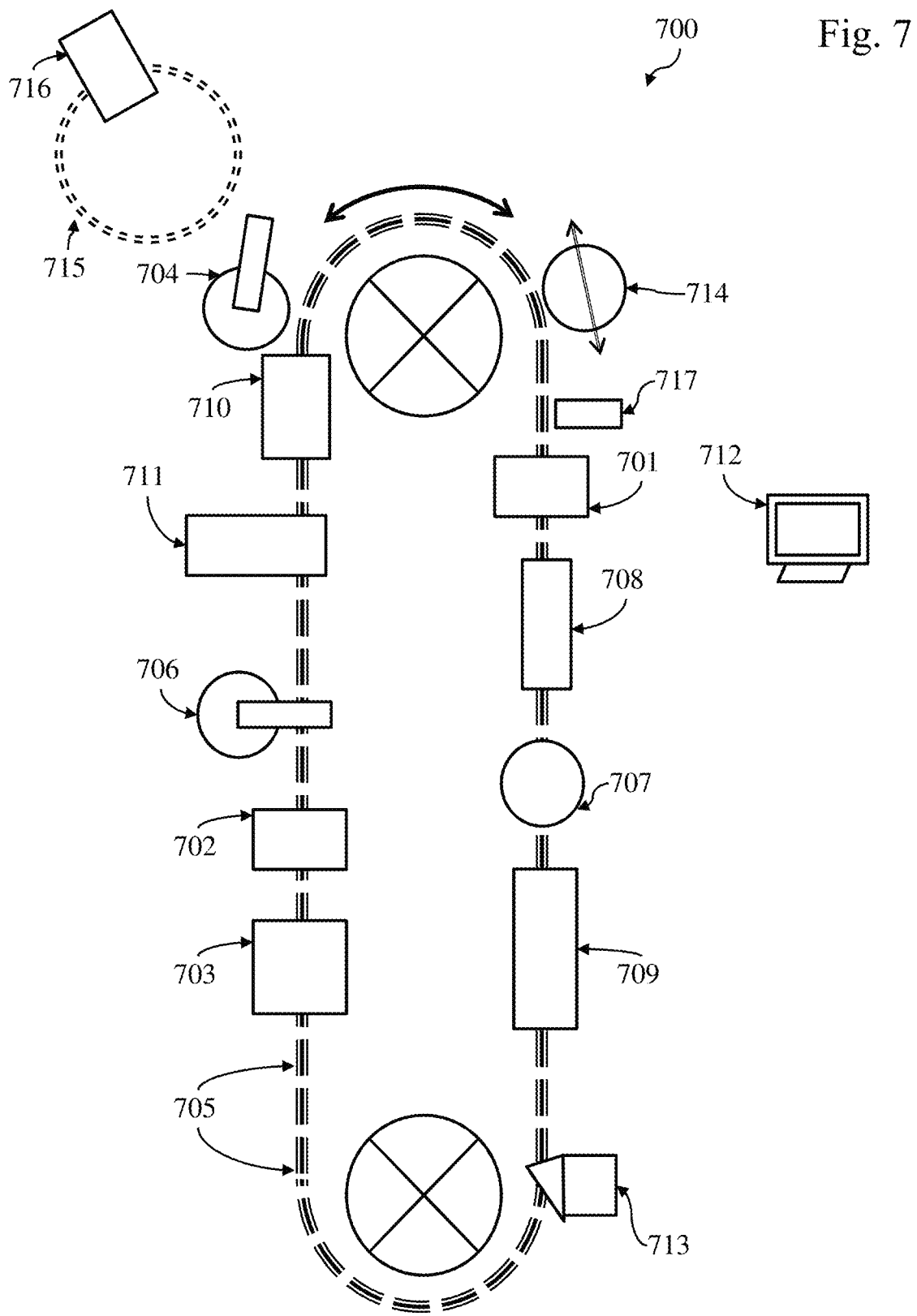
FIG. 7 is a schematic drawing of a production line comprising different devices for processing a product.

The production line (700) shown in FIG. 7 comprises different deposition heads, viz. a first inkjet printer (701) for printing a first type of curable resin, a second inkjet printer (702) for printing a second type of curable resin, and a jetting device (703) for depositing metals, for example tin. The production line (700) also comprises an UV lamp (707) for curing resins, a LED array (708) for curing resins, and/or a heating device (709) for sintering a metal-comprising layer. In addition, the production line (700) may comprise several handling stations which, by way of example, include an output station, e.g. for picking robot (704) for picking a product from a building platform (705), an input station, e.g. placing guide (706) for placing an object on a building platform (705), a layer removal device (711) for removing material, for example by cutting, and a height adjustment station (713) for displacing building platforms (705) to a predefined height above the conveyor. By moving the first and the second transporter at variable speeds relative to each other along a trajectory of the conveyor, new carriers can be input in the conveyor, at the same time avoiding delays at handling stations so that a building station is replenished in time with a subsequent building platform. In this way, different products can be produced quasi-simultaneously and waiting times can be reduced.

The production line (700) further comprises a height measuring station (710) for measuring the height of a product on a building platform, a control unit (712) for controlling the production process, and a pick and place unit (714) for replacing products that have been tooled while being removed from the conveyor. The production line may further comprise a second conveyor (715) for processing a product in an processing station (716). Such processing may be for example a surface treatment. Examples of surface treatments are removal of material, for example by etching or mechanical tooling like polishing. The surface treatment may also be the addition of material, for example by painting, thermal evaporation, electrochemical deposition or atomic layer deposition. The processing may also comprise adding or inserting electronic components, for example computer chips and light emitting diodes. It may also comprise the insertion of certain products that can better made by other techniques than layerwise manufacturing, for example photovoltaic cells, MEMS devices or injection moulded parts. Products can be placed on the second conveyor by a robot (704) and be picked from the second conveyor to be placed on a platform (705). However, the first and second conveyor may also be configured so as that a platform is directed from the first conveyor to the second conveyor. The apparatus further may comprise a reader (717) for automatic reading of codes attached to the platforms, substrates or products. The reader (717) may be an optical reader suitable for reading codes like a barcode or a QR code. It may, however, also be a radio reader suitable for reading information from for example RFID tags, or a magnetic reader for reading information in a magnetizable strip. The reader (717) may sent the information to a control unit, which control unit may comprise a software program for storing information about the platform and the product placed on it. Such software program may decide about the further processing steps that have to be performed with respect to the product or the platform.

The process of layerwise manufacturing may result in an accumulation of errors, for example in the thickness, viz. height, of the product. For these and other reasons, for example visual appearance, sometimes material has to be removed from the already deposited layers or product, for example by cutting, milling, drilling or polishing, more in particular laser polishing. Such a removal may take place outside the production line, viz. away from the conveyor. In particular, when adjustment of the height is required due to imperfections caused for example replacing on the building platform or the vertical displacements of the building platform, the removal of the material has to be or may be performed while the product is on the building platform.

Products made by layerwise manufacturing may be combined with other objects to obtain a compound product. Such other objects may be electrical, optical, magnetic or mechanical functional devices. Examples of such functional devices are computer chips, light emitting diodes, lens systems, actuators, piezoelectric elements, loudspeakers, microphones, and batteries. Such a functional object may be joined with the product after the layerwise manufacturing is completed. However, in particular when the object has to be encapsulated or otherwise integrated with the product, the object has to be placed during the layerwise manufacturing. This may require joining an object made outside the production line with the layerwise manufactured product by placing the object on the building platform. The object may be placed directly on the platform before starting the layerwise deposition. The object may also be placed after one or more layers have been deposited. The object may even be placed after all layers have been deposited.

Figure 9A:
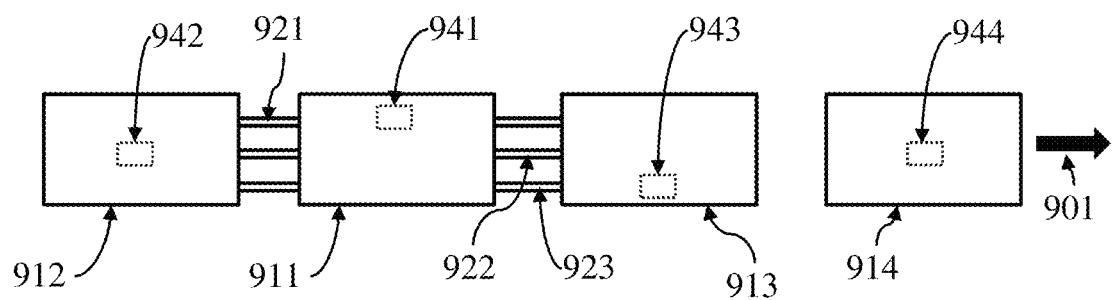
FIG. 9A is a schematic drawing showing a top view of height adjustments means for adjusting the height of a platform.
Figure 9B:
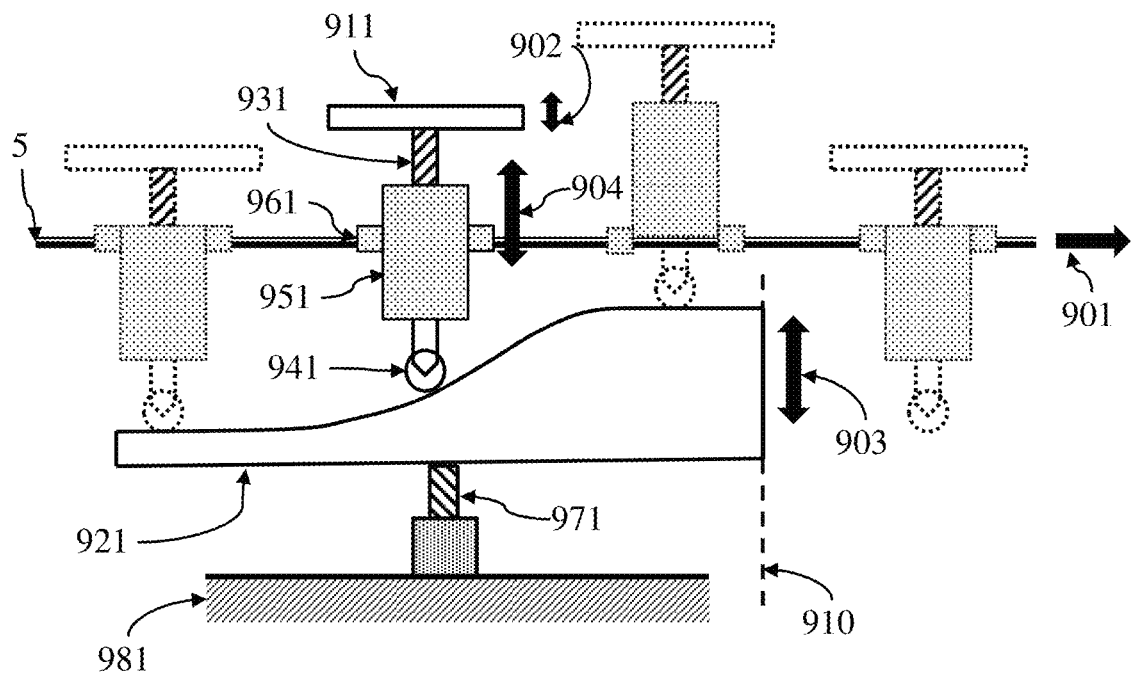
FIG. 9B is a schematic drawing showing a side view of height adjustments means for adjusting the height of a platform.

Preferably, the height of a building platform relative to the conveyor is adjustable. This may be realized by means to displace the building platform relative to the transporter as discussed above. However, a building may also be adjusted at one or more fixed positions along the conveyor by a height adjustment station (713) comprising a tunable height adjustment device as will be discussed here with reference to FIG. 9. A preferred embodiment of such a height adjustment device that is in particular suited for a conveyor that is positioned in a horizontal plane, is shown schematically in FIG. 9. FIG. 9A is a top view and FIG. 9B is a side view of a part of the apparatus. FIG. 9 shows four platforms (911, 912, 913, 914) that can be moved by or on a conveyor (5) in a conveying direction (901). Where in the following description reference is made to only one platform (911) and its height adjustment means, such a description relates also to the other platforms and their height adjustment means. However, although it is preferred to have identical or nearly identical carriers, this need not to be the case. The platform (911) is placed on a transporter (951), which transporter is movable relative to the conveyor (5). The conveyor may for example comprise two parallel guiding rails for supporting the transporter and to allow the carrier moving relative to the conveyor by wheels or other means (961). The part of the transporter that supports the building platform can be pushed upwards (904) relative to the conveyor while moving in the conveying direction (901). FIG. 9 further shows a ramp (921), which ramp may be fixed to the frame of the production line or the ground or floor (981). It is preferred that the ramp can be adjusted in the vertical direction (903), for example by an electromotor or an actuator (971). The carrier basis comprises a wheel (941) that allows the carrier basis to be moved upwards when following the slope of the ramp. A wheel is preferred because this allows moving with hardly any friction, but other guiding means may also satisfy. In this embodiment, the slope must be upwards in the moving direction. It is appreciated that the ramp may be symmetric with respect to the line (910) to allow moving of the conveyor in both directions, so in the direction of the arrow (901) and in the opposite direction. Preferably the ramp is used for large vertical displacement of the carrier. So, a ramp will be situated at positions in the apparatus where the deposition head or a tooling device requires that the platform is moved at relatively large vertical distance. The height adjustment may also be obtained by electro-magnetic means, for example by a combination of a magnet fixed at a transporter and a linear motor defining the height of the transporter relative to the ground or floor. In general, the carrier comprises an actuator (931) for moving the platform accurately in vertical direction (902) relative to the carrier basis.

Although all the carriers may be similar in construction, it is preferred that the position of the wheel (941) is not the same for all the carriers as will be explained here. The ramp is in particular suited for displacing the platforms over a relative large vertical distance, for example up to a few centimetres. In case of a high conveying speed of the carriers and a small distance between neighbouring carriers, it will be very difficult to move two neighbouring carriers to different heights because this would require huge accelerations. To solve this problem, the production line may comprise multiple ramps in parallel as shown in FIG. 9A. Here, the number of ramps (921, 922, 923) is three, but it will be appreciated that a larger number of ramps, for example five, may be preferred and that a lower number, for example two, may satisfy. The wheels (941, 942, 943, 944) of the subsequent platforms (911, 912, 913, 914) are positioned in such a way that the wheels are not in line with each other but follow parallel trajectories. This allows the wheels to follow different parallel ramps. So, wheel (941) will follow ramp (921), wheel (942) will follow ramp (922), wheel (943) will follow ramp (943), and wheel (944) has followed ramp (922). Because the height of the ramps can be adjusted independently from the others, the height of neighbouring transporters and thus the platforms can be different. In the embodiment of FIG. 9, each third platform (912, 914) uses the same ramp (922). Depending on the length of the ramp relative to the distance of the wheels in the conveying direction (901), the conveying speed, and the required adjustment of the height of the carrier, a larger number of ramps may be preferred. In particular, an embodiment comprising five ramps and five corresponding vertical positions of the wheels may be advantageous. The embodiment of the apparatus comprising several ramps as described above, provides a large degree of freedom in making different products on neighbouring platforms.

Figure 10:
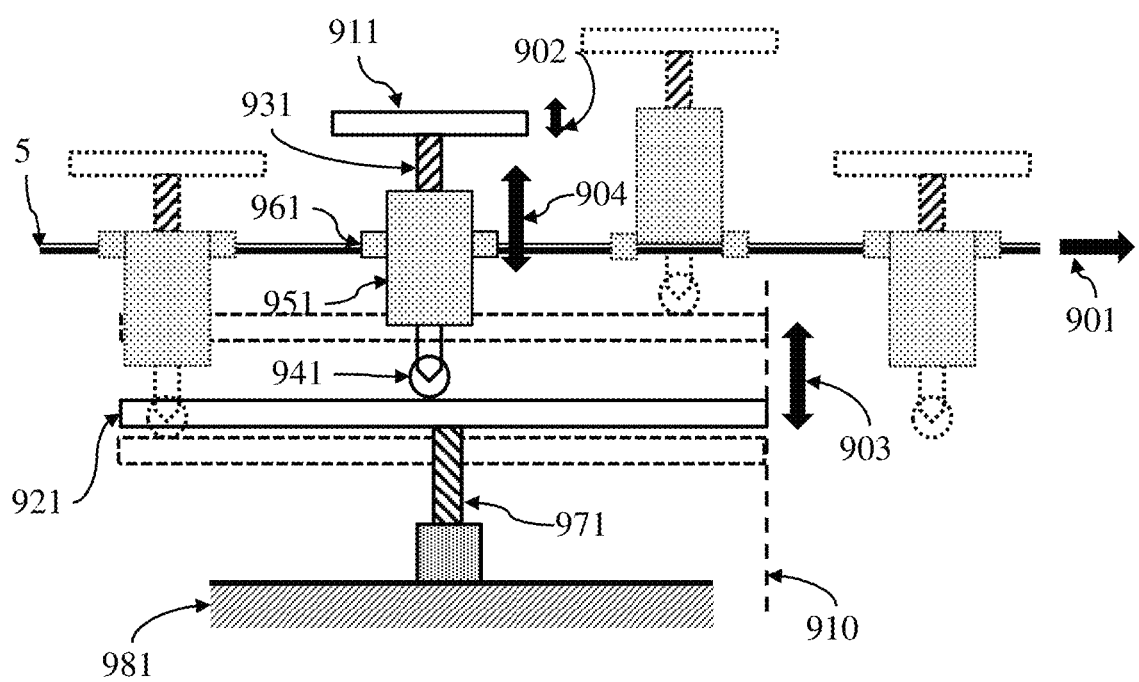
FIG. 10 is a schematic drawing of a different embodiment of the height adjustment device shown in FIG. 9.

The embodiment shown in FIG. 9B comprises a ramp and means (971) for vertically adjusting the ramp. In another embodiment comprising such adjustment means, the ramp (921) may be flat as is shown in FIG. 10. In such an embodiment, the height of a transporter (951) relative to the floor (981) is determined by the vertical adjustment means (971). An advantage of such an embodiment is that the acceleration of the transporter in the vertical direction may be adapted during the production cycle and is not predefined by the shape of the ramp as is the case for the embodiment of FIG. 9B.

The production line as shown in FIG. 7, comprises a picking robot (704) for picking a manufactured product from a building platform. Preferably, the picking robot allows the product to be picked while the platform is moving, possible at a lower speed. This can be realized for example by moving the picking robot during the picking time with the same velocity as the building platform parallel to the conveyor. Those skilled in the art will be familiar with different types of picking robots. The picking robot may also be suitable to place a product on the building platform, although the production line may comprise a placing guide (906) that is configured for placing products. Such a product may be a previously manufactured layered product or it may be a device with specific mechanical, electrical, or optical functionality.

The production line may comprise a curing device for curing a layer of construction material to obtain a patterned solidified and coherent layer corresponding to a cross section of the product to be manufactured. Such a curing device may be a device providing electromagnetic radiation, for example ultraviolet light. Preferably, such a UV source can provide the UV radiation in a predefined pattern, for example by means of a scanning laser or an array of small UV sources, like for example light emitting diodes. However, in some embodiments of the production line, the curing device may provide a more or less homogeneous curing condition along the whole area of the layer. Such a homogeneous source, for example a UV or infrared lamp, can be applied for after curing of a pre-cured layer. It may also be applied if the layer is composed of two types of materials; the curable construction material and a supporting material that is not cured under these conditions.

Figure 8:
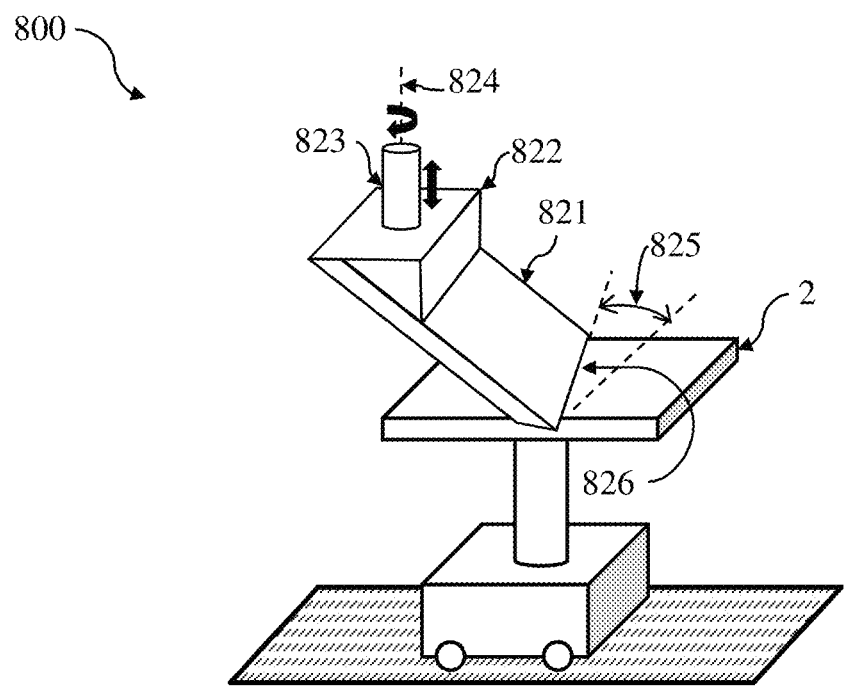
FIG. 8 is a schematic drawing of a cutting device.

During additive manufacturing, layers are deposited on top of each other. This may result in an accumulation of errors in the thickness. Also, picking of a semi-finished product an replacing it on a platform may introduce errors. For this and other reasons, it may be advantageous to have the possibility to adjust the height of a product. If the height during a certain stage of the fabrication is too low, an additional layer can be deposited. If, however, the product is too high, some material has to be removed. To allow such a removal, the production line may comprise a layer removal device (711) for removing material from the already manufactured product. Such a layer removal device may be a cutting unit comprising a knife that is adjusted such as to remove a slice of the solidified material. Due to the fact that the production line allows fast movement of the platforms and thus of the products relative to the knife that may be placed at a fixed position relative to the conveyor, typically the speed can be up to several metres per second, such a cutting may be favourable applied. An embodiment of such a cutting unit is shown in FIG. 8. The cutting unit (800) comprises a knife (821) that is attached to the apparatus by a stage (822, 823) that allows the knife to be positioned. The stage is configured as to move the knife in the vertical direction in order to adjust the height of the knife with respect to the platform (2). Preferably, the knife can be rotated along a vertical axis (824) in order to vary the in-plane angle (825) between the cutting edge (826) of the knife and the platform.

The invention is not limited to specific dimensions or technical specifications of the production line and its elements. The building platforms may have a rectangular area which is typically less than 400 mm×200 mm, more particular less than 200 mm×200 mm, or less than 100×200 mm, or even more particular less than 100 mm×50 mm. The inventors preferred a building area of 50 mm×75 mm. However, the deposition area may also be larger than 400 mm×200 mm. The building platform need not to be rectangular, but may for example also be elliptical, or more specific round as shown in FIG. 5. An advantage of a rectangular platform is the optimal use of space. The platform area may be adapted to a specific shape of the ground area of the product to be manufactured. The number of building platforms is not limited and will in practice be chosen taking into account the number of different products to be manufacture, the size of the products, the maximum dimensions of the production line or other criteria. One of such other criteria may be the required distance between the platforms in view of the differences in speed of the platforms. A typical number of building platforms is between 300 and 10, more in particular between 200 and 50, or even more particular between 150 and 75. The inventors preferred a number of 100 in case there is no large variation in speed between the carriers and the conveyor is an endless conveyor with a length of 6 metres. In a production line where the difference in speed of the building platforms is high or where a platform may stand still for some time, the number of platforms may be less. The number of platforms may be even or odd. Basically, there is no upper limit to the number of platforms other than that the conveyor is fully occupied by platforms. It is appreciated that the production line can in particular been exploited advantageously if it comprises a significant number of building platforms. However, the production line may have a limited number of nine buildings platforms or less to take advantage of repeated exposure to the deposition head and the possibility to pick products out of the production line without the need to stop the carrier. Typically, the speed of a carrier may be between 10 m/s and 1 m/s, for example 2 m/s or 4 m/s depending, among others on the type of deposition heads. However, speeds higher than 10 m/s seem feasible for specific embodiments, whereas speeds lower than 1 m/s or even 0.5 m/s may be suited for other embodiments. In a production line comprising a drop on demand deposition head the platform may for example have a speed of 1.5 m/s or less relative to the deposition head during deposition on the construction material.

After the product is finished, it has to be removed from the building platform. This removal may for example be realized by picking up the product from the platform or by transferring the substrate on which the product is built, from the platform. After the product is removed from a building platform, this platform is available for the manufacturing of a second product. The height of the empty building platform usually needs to adjusted as to provide the proper distance between the building platform and the deposition head for depositing the first layer of the second product. The platform moves towards the deposition head for receiving the first layer of the second product, either before adjusting its height, after adjusting, or during adjusting. This second product need not be the same as previous product, although it may be the same, because the shape and composition of the layers can be determined for each individual layer. Although the word second is used here, the word should not be interpreted in its literal sense. Actually, the second product may be any subsequent product.

The conveyor of the production line may be arranged to allow a building platform to be conveyed along different trajectories as will be illustrated with reference to FIG. 6. Such an embodiment may be favourable to minimize the variation in speed between the platforms because for example processes that require relative long time can be performed for multiple products simultaneously or quasi-simultaneously along different trajectories as defined by the different branches of the conveyor. The conveyor (5) of the embodiment of the production line shown in FIG. 6 comprises two branches. The first branch (605) may comprise a curing unit (34) and the second branch (615) may comprise a height measuring station (710). Either the transporter or the conveyor comprises means to direct a platform either towards the first branch of the conveyor or towards the second branch of the conveyor. Those skilled in the art of industrial transporting systems know how to realize such a switch.

The production line can be extended with additional branches, which branches need not to be configured as endless branches. The production line may for example comprise an input line for carriers and an output line for finished products. Several branches each comprising the same device may be applied to process several products simultaneously. The branches may also comprise different devices.

All embodiments of the production line described above may comprise a processing unit for controlling the different process steps. Such a processing unit can be used to regulate the speed of the different carriers and the trajectory that each carrier has to follow. The processing unit may also provide information about which processing step has to be performed on each of the building platforms. The processing unit may comprise a digital description of the products to be manufactured, including a description of layers to be deposited or the lighting pattern for curing such a layer.

The invention also relates to a method for layerwise manufacturing of tangible products according to which a first carrier comprising a first building platform is moving along a trajectory leading the building platform along the deposition head while a second carrier comprising a second building platform is moving along the convey with a different speed. An embodiment of this method will be illustrated with reference to FIG. 4. At a certain moment in time during performing the method, a first building platform (2) is at a position of the conveyor indicated by "A", a second building platform (407) may be at a position indicated by "D". At such moment the speed of the first building platform may be lower, here 2 m/s, than the speed of the second building platform, here 3 m/s. The higher speed of the second building platforms allows that this platform will timely reach the deposition head (4) although the trajectory is long.

In another embodiment of the method for layerwise manufacturing of tangible products, two carriers move along different trajectories as will be illustrated with reference to FIG. 6. In this embodiment, a layer of construction material is deposited by a deposition head (4) on a building platform (602) at the position indicated by "A". After deposition, the platforms moves to a position indicated by "B". After passing this position, the building platform can follow either a first trajectory (605) leading the building platform along a curing unit (34) or the building platform can follow a second trajectory leading the building platform along a height measuring station (710). After passing either the curing unit or the height measuring station, the platform moves towards the deposition head via the position indicated by "D".

The two different trajectories can be used to change the order of the platforms. For example, if a first platform (608) following the first trajectory moves slower than a second platform (607) following the first trajectory, the second platform may pass the first platform and arrive earlier at position D even this second platform started later from position B. It will be appreciated that the method can be applied for more trajectories than two and for different types of stations along such trajectories.

We claim:

1. A production line for layerwise manufacturing of tangible products comprising:
    a first and a second movable carrier, each carrier comprising:
        a transporter for transporting the carrier, and
        a building platform for supporting a tangible product,
    one or more deposition heads for depositing construction material in a deposition direction onto the building platforms, and
    a conveyor for conveying the building platforms towards the deposition head and away from the deposition head repeatedly,
    wherein the first and the second transporter are movable at variable speeds relative to each other along a trajectory of the conveyor.

2. The production line according to claim 1, wherein the building platform for each of the first and second movable carriers is mounted on an arm, which arm can pivot around an axis relative to the transporter.

3. The production line according to claim 1, wherein the conveyor is an endless conveyor.

4. The production line according to claim 1, wherein the conveyor comprises banked curves.

5. The production line according to claim 1, wherein the conveyer is arranged to allow conveying the building platform of each of the first and second movable carriers along multiple trajectories.

6. The production line according to claim 1, each of the first and second movable carriers further comprising a height adjustment means that is configured for displacing the building platform of each movable carrier relative to the transporter of the movable carrier in a direction parallel to the deposition direction.

7. The production line according to claim 6, further comprising one or more handling stations for handling the tangible product, wherein the first and second transporters are movable at variable speeds relative to each other along the trajectory of the conveyor between the handling stations, wherein each of the one or more handling stations comprises an input unit for inputting new carriers in the conveyor, and wherein the height adjustment means is tuneable and is controlled individually for quasi-simultaneous production of different products.

8. The production line according to claim 1, wherein the building platform of each movable carrier is movable relative to the transporter of each movable carrier in a plane perpendicular to the deposition direction.

9. The production line according to claim 8, wherein the building platform of each of the first and second movable carriers is rotatable in said plane.

10. The production line according to claim 8, wherein the building platform of each of the first and second movable carriers is transferable in said plane.

11. The production line according to claim 1, further comprising one or more handling stations for handling the tangible product, wherein the first and second transporters are movable at variable speeds relative to each other along the trajectory of the conveyor between, each of the first and second transporters moving between two of the one or more handling stations.

12. The production line according to claim 11, wherein each of the one or more handling stations comprises a cutting unit for removing material from a manufactured product on the building platform for each of the first and second movable carriers.

13. The production line according to claim 11, wherein each of the one or more handling stations comprises a reader and a processing unit for controlling the processing steps of the tangible product.

* * * * *